United States Patent
Fujisawa et al.

(10) Patent No.: US 6,702,677 B1
(45) Date of Patent: *Mar. 9, 2004

(54) ENTERTAINMENT SYSTEM, ENTERTAINMENT APPARATUS, RECORDING MEDIUM, AND PROGRAM

(75) Inventors: Takafumi Fujisawa, Tokyo (JP); Jun Tsuda, Tokyo (JP); Takeshi Shimizu, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 26 days.

This patent is subject to a terminal disclaimer.

(21) Appl. No.: 09/687,578

(22) Filed: Oct. 13, 2000

(30) Foreign Application Priority Data

Oct. 14, 1999 (JP) .......................................... 11-292675

(51) Int. Cl.[7] .............................................. A63F 13/00
(52) U.S. Cl. .................... 463/43; 434/307 A; 84/477 R
(58) Field of Search ............... 84/477 R, 600, 84/601, 635, 637, 667, 609, 611; 345/764, 716, 727, 839, 978; 463/43, 42, 30, 35; 434/307 A, 247, 307 R, 365; 482/900–903; 381/119

(56) References Cited

U.S. PATENT DOCUMENTS

| | | | | |
|---|---|---|---|---|
| 5,212,733 A | * | 5/1993 | DeVitt et al. ............... | 381/119 |
| 5,315,057 A | * | 5/1994 | Land et al. .................... | 84/601 |
| 5,491,297 A | * | 2/1996 | Johnson et al. ............... | 84/609 |
| 5,592,602 A | * | 1/1997 | Edmunds et al. ........... | 345/474 |
| 5,623,112 A | | 4/1997 | Ito et al. | |
| 5,627,335 A | | 5/1997 | Rigopulos et al. ............ | 84/635 |
| 5,680,534 A | * | 10/1997 | Yamato et al. ............... | 345/473 |
| 5,684,259 A | * | 11/1997 | Horii ............................ | 84/600 |
| 5,763,804 A | | 6/1998 | Rigopulos et al. ............ | 84/635 |
| 5,782,692 A | | 7/1998 | Stelovsky | |
| 5,859,380 A | * | 1/1999 | Anada ........................ | 84/611 |
| 5,919,047 A | * | 7/1999 | Sone ..................... | 434/307 A |
| 6,011,212 A | | 1/2000 | Rigopulos et al. ............ | 84/667 |
| 6,066,792 A | | 5/2000 | Sone | |
| 6,150,598 A | | 11/2000 | Suzuki et al. | |
| 6,177,624 B1 | * | 1/2001 | Takahashi et al. ............ | 84/609 |
| 6,211,453 B1 | | 4/2001 | Kurakake | |
| 6,281,420 B1 | | 8/2001 | Suzuki et al. | |
| 6,320,110 B1 | * | 11/2001 | Ishikawa et al. ............... | 84/600 |
| 6,347,998 B1 | * | 2/2002 | Yoshitomi et al. ............ | 463/42 |
| 6,353,170 B1 | | 3/2002 | Eyzaguirre et al. | |
| 6,450,888 B1 | * | 9/2002 | Takase et al. ................. | 463/43 |

FOREIGN PATENT DOCUMENTS

| | | |
|---|---|---|
| EP | 0 920 892 A2 | 6/1999 |
| JP | 8-305356 | 11/1996 |

OTHER PUBLICATIONS

European Patent Office; "European Serach Report"; cited in European Patent Application No. EP 00 30 9033 corresponding to related to U.S. application Ser. No. 09/687,464; dated Jun. 20, 2003; pp. 1–2.

(List continued on next page.)

Primary Examiner—Teresa Walberg
Assistant Examiner—Yveste G Cherubin
(74) Attorney, Agent, or Firm—Fitch, Even, Tabin & Flannery

(57) ABSTRACT

An entertainment system includes a sound presentation trial processing unit for displaying an object relatively moving on at least one track displayed on a display unit, allowing the user to try to acquire the object with a control input, and outputting a sound assigned to the track on which the object is relatively moving when the acquisition of the object with the control input is detected. The sound presentation trial processing unit includes a program activating unit for activating a control input processing unit to perform a processing depending on a control input from a manual controller, and an image sound output processing means for changing the image of the object when the acquisition of the object is detected and outputting a sound according to a predetermined control action.

14 Claims, 23 Drawing Sheets

OTHER PUBLICATIONS

"IQS SAW, 4–Spur–Harddisk–Recording fur Windows–PC"; Keyboards, Music Media Verlag; Augsburg; Apr. 1994; pp. 148–152; XP–002240866; (full 10–page English translation also included).

A. Merck; "Steinberg Cubase Audio Sequenzer & Handdisk–Recording fur Apple Macintosh"; Keyboard, Music Media Verlag; Augsburg; Jan. 1993; pp. 112–116; XP–002240715; (full 10–page English translation also included).

Classic Gaming; "Arcade Games: N–P Ping Pong"; URL:www.classicgaming.com/vault/roms/arcaderoms.PingPong11735.shtml; Retrieved from the internet on Apr. 8, 2003; (one page).

European Patent Office; "European Search Report"; cited in corresponding European Patent Application No. EP 00 30 9040; dated May 27, 2003; pp. 1–3.

Japanese Patent Office; "Rejection of the Application"; Mailing No. 101038; Mailing Date: Apr. 1, 2003; pp. 1–4 (including one–page English translation of portions).

U.S. patent application Ser. No. 09/687,464, Fujisawa et al., filed Oct. 13, 2000.

A. Merck; "Steinberg Cubase Audio Sequenzer & Handdisk–Recording fur Apple Macintosh"; Keyboard, Music Media Verlag; Augsburg; Jan. 1993; pp. 112–115 and 118; XP–002240715; (full 10–page English translation also included).

* cited by examiner

CONTROL INPUT PROCESSING

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system having at least one manual controller connected to an entertainment apparatus which executes various programs, for entering control requests from the user into the entertainment apparatus, an entertainment apparatus which executes various programs, a recording medium storing a program and data that are used by the entertainment system, and a program itself.

2. Description of the Related Art

Some entertainment systems including entertainment apparatus such as video game machines display video game images based on video game data stored in a recording medium such as a CD-ROM or the like on the display screen of a television receiver while allowing the user or game player to play the video game with commands entered via a manual controller.

In those entertainment systems, the entertainment apparatus and the manual controller are usually connected to each other by a serial interface. When a clock signal is supplied from the entertainment apparatus to the manual controller, the manual controller sends key switch information based on the user's control entries in synchronism with the clock signal.

Recently developed manual controllers incorporate a vibration generating means for applying vibrations to the user based on a request from an external apparatus such as an entertainment apparatus, for example. While a video game is in progress, the vibration generating means applies various different kinds of vibrations to the user in response to user's different control entries.

Almost all video games performed using the above entertainment system are accompanied by background music (BGM) that is outputted at all times while the video game is being played. Even when the user makes some action in the video game with its control input, the background music is continuously performed irrespective of the action, distracting the user's attention from the video game itself.

SUMMARY OF THE INVENTION

It is therefore an object of the present invention to provide an entertainment system, an entertainment apparatus, a recording medium, and a program which are capable of outputting a sound in response to a predetermined control input from the user to add musical interest to a video game or the like.

Another object of the present invention is to provide an entertainment system, an entertainment apparatus, a recording medium, and a program which can produce various sounds in response to control inputs from the user thereby to complete a piece of music, thereby allowing the user to enjoy the fun of completing a piece of music.

According to the present invention, there is provided an entertainment system comprising an entertainment apparatus for executing various programs, at least one manual controller for entering control requests from the user into the entertainment apparatus, a display unit for displaying images outputted from the entertainment apparatus, and sound presentation trial processing means for displaying an object relatively moving on at least one track displayed on the display unit, allowing the user to try to acquire the object with a control input, and outputting a sound assigned to the track on which the object is relatively moving when the acquisition of the object with the control input is detected.

According to the present invention, there is also provided an entertainment apparatus for connection to a manual controller for outputting a control request from the user and a display unit for displaying images, comprising sound presentation trial processing means for displaying an object relatively moving on at least one track displayed on the display unit, allowing the user to try to acquire the object with a control input, and outputting a sound assigned to the track on which the object is relatively moving when the acquisition of the object with the control input is detected.

According to the present invention, there is further provided a recording medium storing a program and data for use in an entertainment system having an entertainment apparatus for executing various programs, at least one manual controller for entering manual control requests from the user into the entertainment apparatus, and a display unit for displaying images outputted from the entertainment apparatus, the program stored in the recording medium comprising the steps of displaying an object relatively moving on at least one track displayed on the display unit, allowing the user to try to acquire the object with a control input, and outputting a sound assigned to the track on which the object is relatively moving when the acquisition of the object with the control input is detected.

According to the present invention, there is further provided a program readable and executable by a computer, for use in an entertainment system having an entertainment apparatus for executing various programs, at least one manual controller for entering manual control requests from the user into the entertainment apparatus, and a display unit for displaying images outputted from the entertainment apparatus, the program comprising the steps of displaying an object relatively moving on at least one track displayed on the display unit, allowing the user to try to acquire the object with a control input, and outputting a sound assigned to the track on which the object is relatively moving when the acquisition of the object with the control input is detected.

The display unit displays an object relatively moving on at least one track. The user tries to acquire the object by entering a control input. When the object is acquired, a sound assigned to the track on which the object has been relatively moving is outputted.

If there are a plurality of tracks, then when objects relatively moving on the tracks are successively acquired, sounds assigned to the tracks are successively outputted, and a piece of music is completed based on a combination of the sounds.

Therefore, the entertainment system according to the present invention can output a sound in response to a control input entered by the user, adding musical interest to a video game or the like. By producing various sounds in response to control inputs entered by the user, one piece of music can be completed, thereby allowing the user to enjoy the fun of completing a piece of music.

The sound presentation trial processing means or corresponding steps may comprise object displaying means for, or the step of, displaying the object relatively moving on at least one track, object acquisition determining means for, or the step of, determining whether the object has been acquired with a control input or not, and sound outputting means for, or the step of, outputting a sound assigned to the track on which the object is relatively moving when the object acquisition determining means determines that the object has been acquired.

The sound presentation trial processing means or corresponding steps may comprise acquiring object displaying means for, or the step of, displaying an acquiring object to acquire the relatively moving object, and the object acquisition determining means or corresponding step may comprise means for, or the step of, determining that the object is acquired if the distance between the acquiring object and the relatively moving object falls in a predetermined range when a predetermined control input is entered from the manual controller.

If a plurality of tracks are displayed on the display unit, then the object acquisition determining means or corresponding step may comprise means for, or the step of, determining that the object is acquired if a track on which the acquiring object and a track on which the relatively moving object are the same as each other when the predetermined control input is entered from the manual controller, and also if the distance between the acquiring object and the relatively moving object falls in the predetermined range.

There may be further included indicator displaying means for, or the step of, displaying an indicator image indicative of one of the tracks on which the object is coming.

If a sound pattern assigned to the track is disposed as a bit string indicative of whether the sound is to be outputted or not outputted, on the track, there may be further included light spot displaying means for, or the step of, displaying a bit string related to the acquired object and indicative of an output state, of the sound pattern disposed on the track on which the acquired object is positioned, in relative motion as an array of light spots, and the sound outputting means or corresponding step may comprise means for, or the step of, outputting a sound assigned to a light spot which has reached the acquiring object, of the sound pattern assigned to the track.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An entertainment system and an entertainment apparatus according to the present invention as applied to a video game apparatus, and a recording medium and a program according to the present invention as applied to a recording medium which stores a program and data to be executed by the video game apparatus and a program to be executed by the video game apparatus will be described below with reference to FIGS. 1 through 23.

Figure 1:
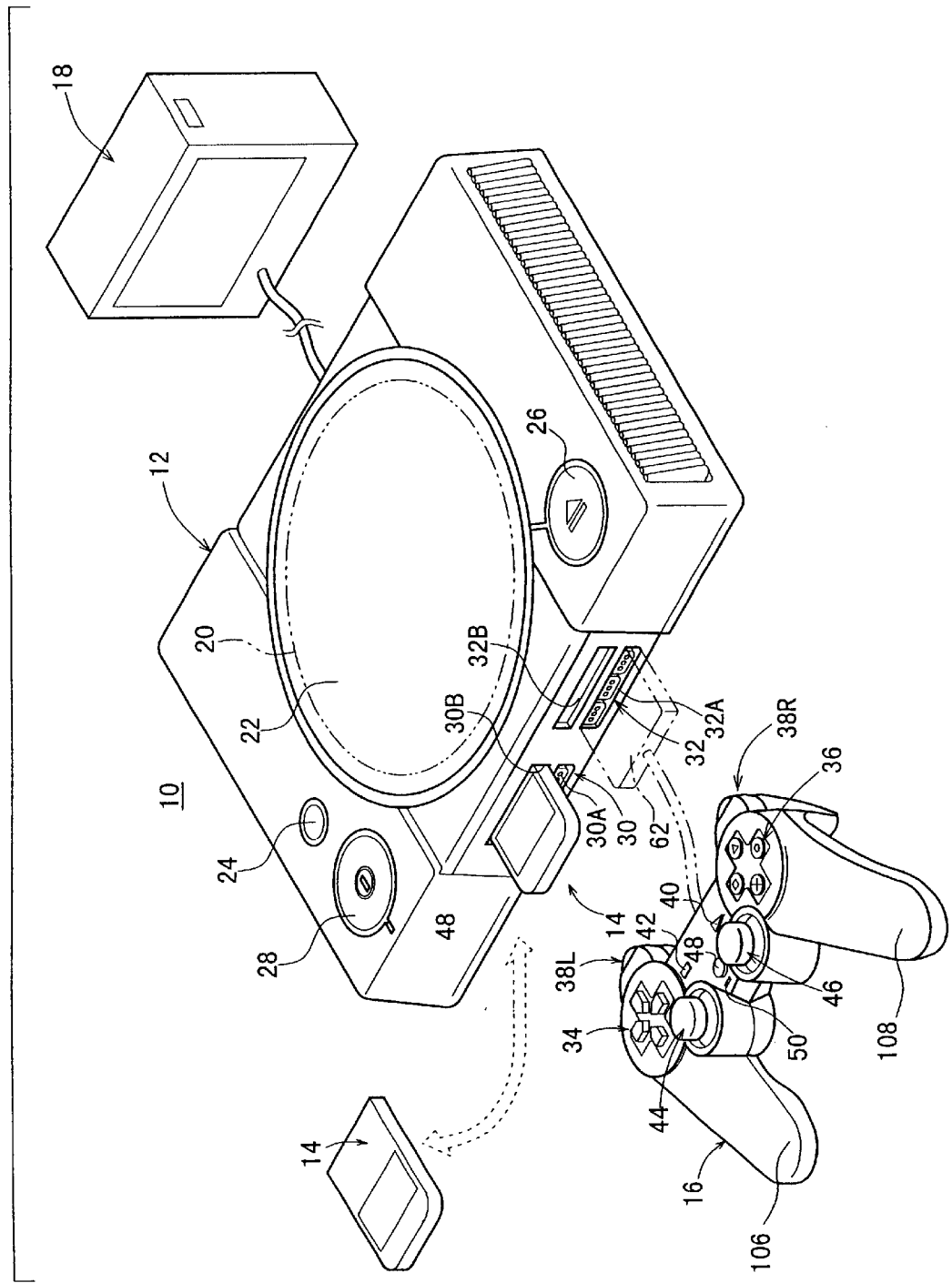
FIG. 1 is a perspective view of an entertainment system according to the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from the user, e.g., the game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 or portable information terminals (not shown) having the function of the memory card 14 for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
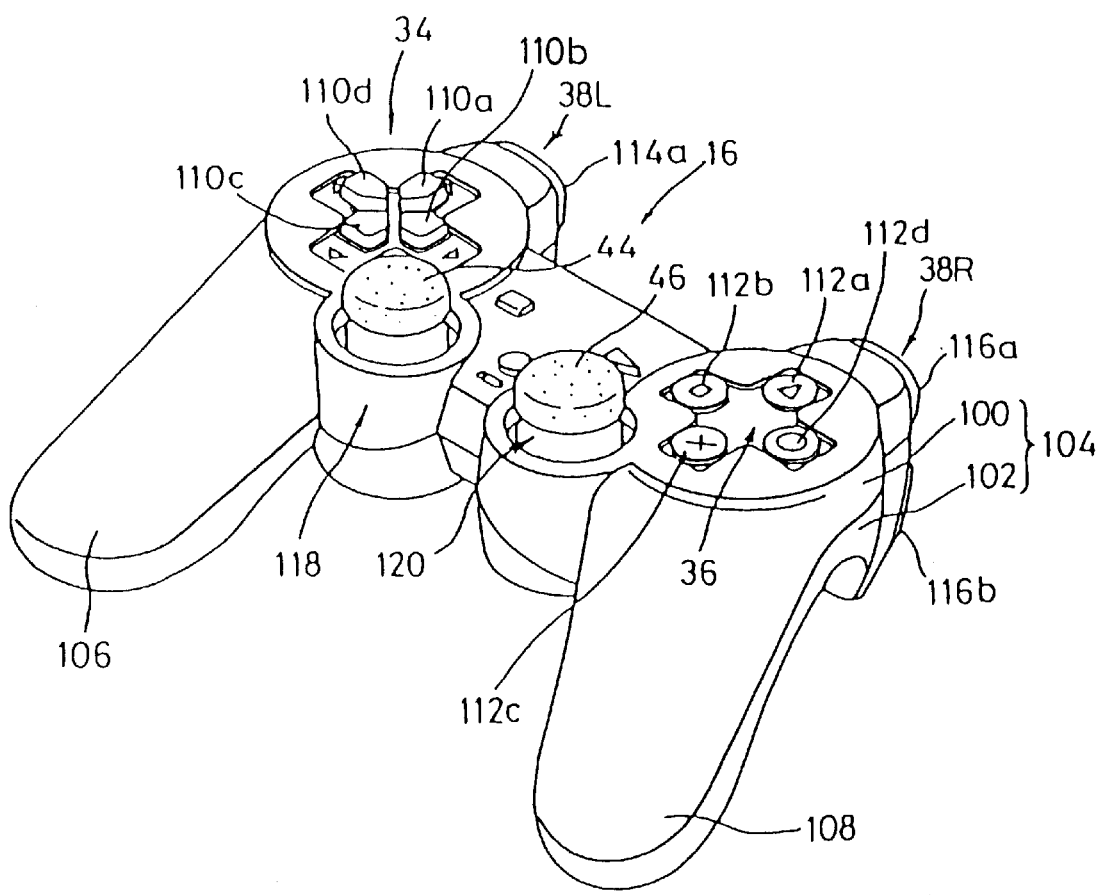
FIG. 2 is a perspective view of a manual controller.
Figure 3:
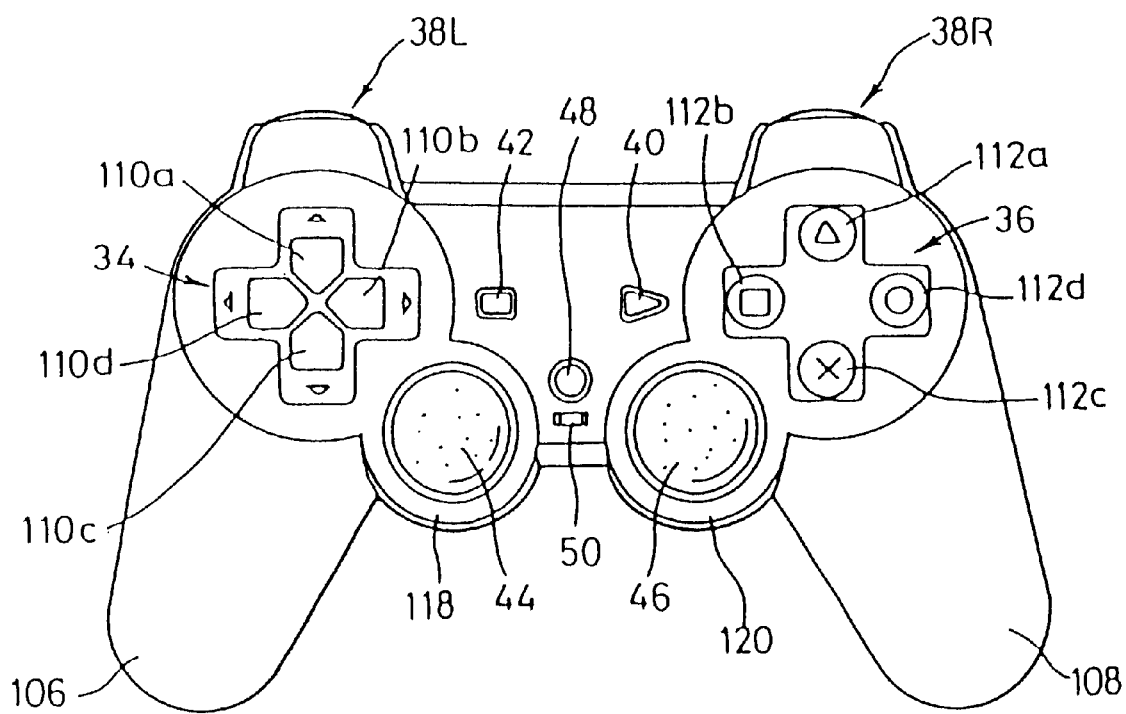
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and a mode indicator 50 for indicating a selected control mode. The mode indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends.

To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 110c, and a fourth pressable control member (right button) 110d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (X button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
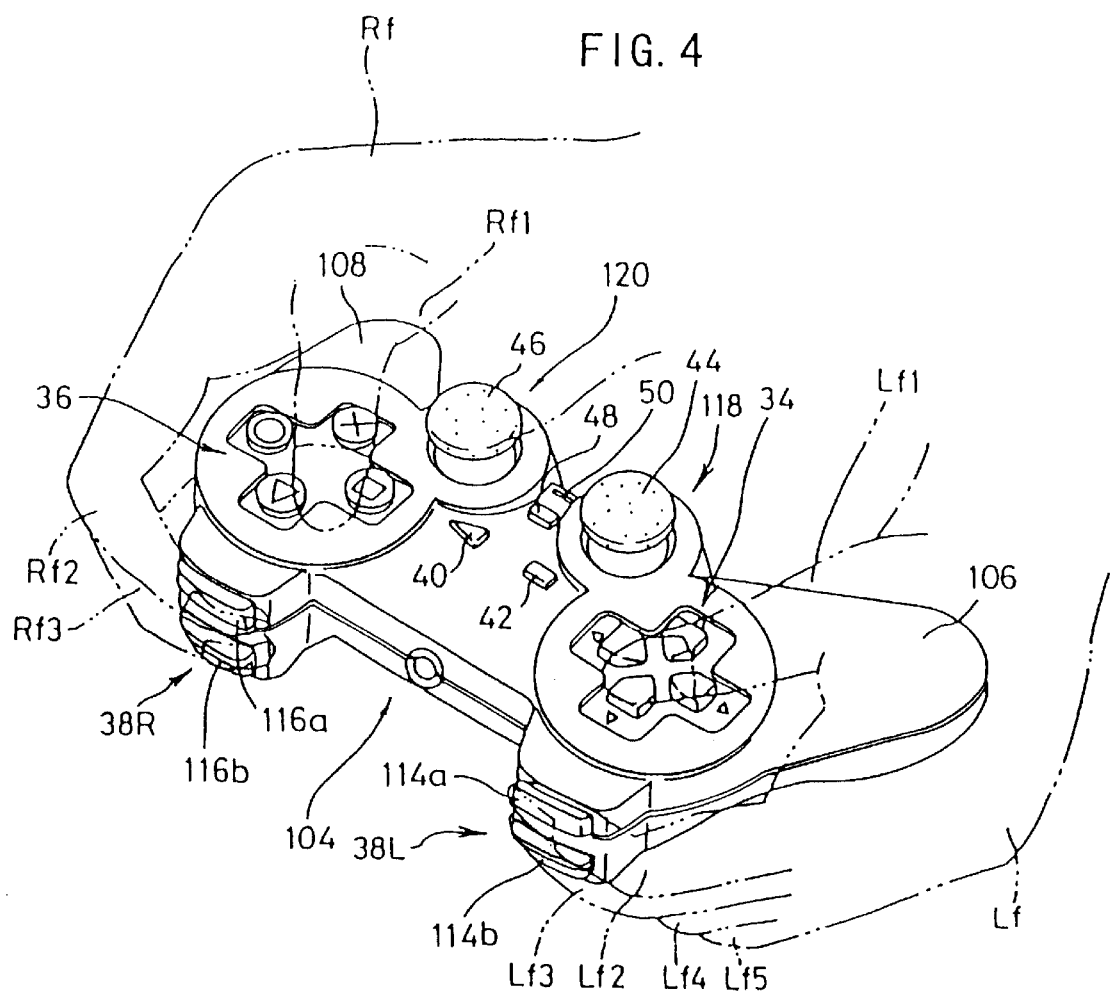
FIG. 4 is a perspective view showing the manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively. The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shafts of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, it can also select a control mode for allowing a command signal to be inputted from the first and second analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and RI button 116a, R2 button 116b of the R button 38R.

Figure 5:
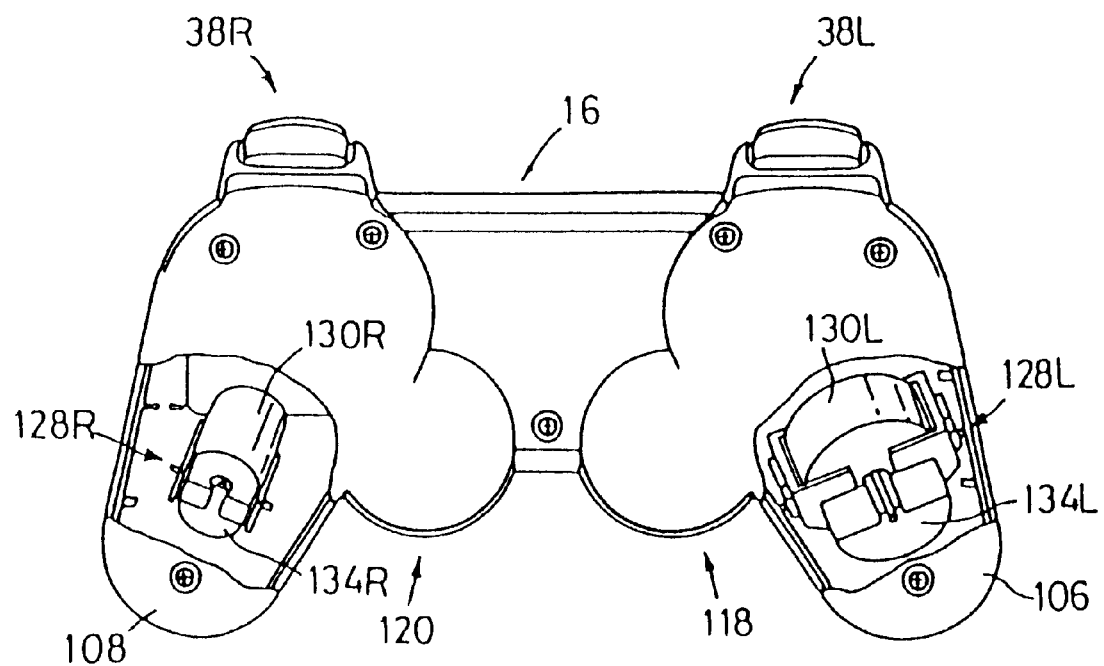
FIG. 5 is a bottom view, partly broken away, of the manual controller, showing vibration imparting mechanisms disposed respectively in left and right grips thereof.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R comprises a weight in the form of a heavy metal member having a semicircular cross-sectional shape. The weight has an off-center hole defined therein in which the drive shaft of the motor 130R is fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration mechanism 128L, the vibration frequency of the motor 130R of the right vibration mechanism 128R does not vary according to the vibration value included in the vibration generating command. The motor 130R of the right vibration mechanism 128R is simply either energized or de-energized according to the vibration value. If the vibration value (logic value) is "1", the motor 130R of the right vibration mechanism 128R is energized. If the vibration value is "0", the motor 130R of the right vibration mechanism 128R is de-energized. When the motor 130R of the right vibration mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Figure 6:
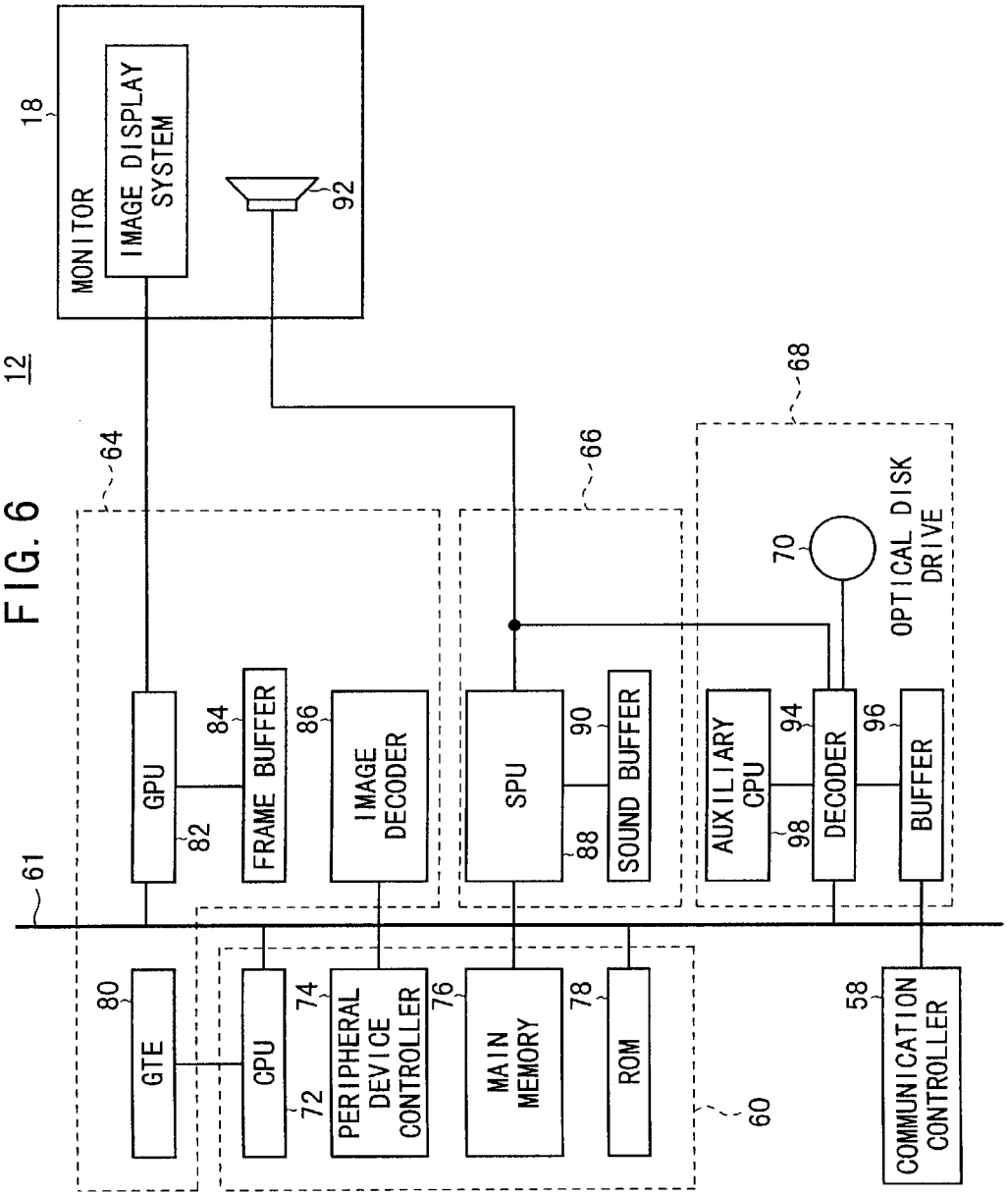
FIG. 6 is a block diagram of a circuit arrangement of an entertainment apparatus.

Now, circuit arrangements of the entertainment apparatus 12 and the manual controller 16 will be described below with reference to FIGS. 6 through 8.

Figure 8:
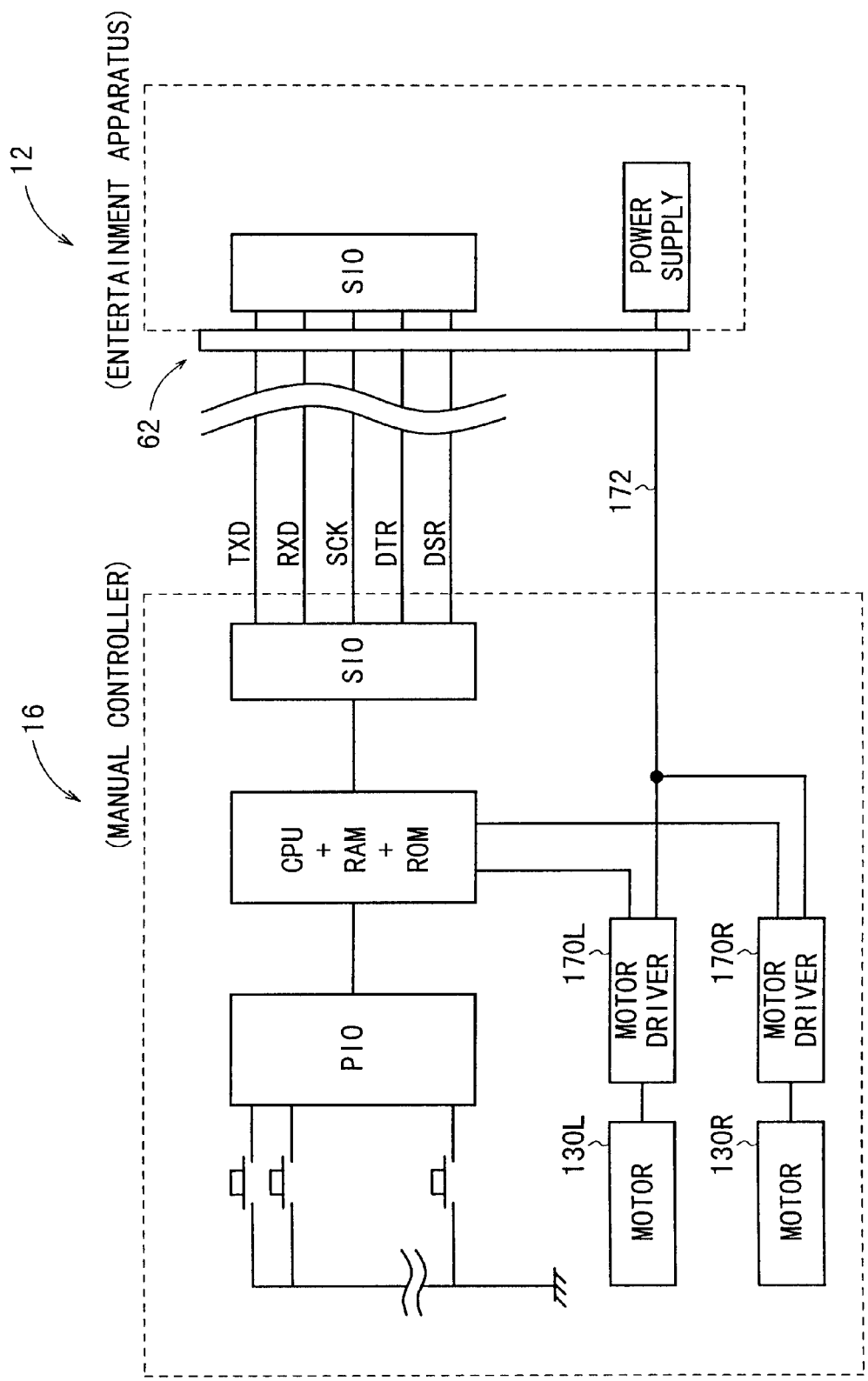
FIG. 8 is a block diagram of components for carrying out bidirectional serial communications between the manual controller and the entertainment apparatus.

As shown in FIG. 8, the entertainment apparatus 12 generally comprises a control system 60, a graphic generating system 64 connected to the control system 60 via a system bus 61, a sound generating system 66 connected to the control system 60 via the system bus 61, and an optical disk control system 68 connected to the control system 60 via the system bus 61. A communication controller 58 for controlling data to be inputted to and outputted from the manual controller 16 and the memory card 14 is also connected to the control system 60 via the system bus 61.

The manual controller 16 supplies commands (including control data) from the user via a communication controller 150 (see FIG. 7) of the manual controller 16 and the communication controller 58 to the entertainment apparatus 12. The optical disk control system 68 includes an optical disk drive 70 in which the optical disk 20, which may comprise a CD-ROM or the like as a specific example of a recording medium according to the present invention.

The control system 60 controls motions of characters displayed on the monitor 18 based on a program and data read from the optical disk 20 and commands supplied from the manual controller 16.

The control system 60 includes a central processing unit (CPU) 72, a peripheral device controller 74 for controlling interrupts and direct memory access (DMA) data transfer, a main memory 76 comprising a random-access memory (RAM), and a read-only memory (ROM) 78 which stores various programs such as an operating system for managing the graphic generating system 64, the sound generating system 66, etc. The main memory 76 can store at least a game program that is supplied from the optical disk 20 and executed by the central processing unit 72.

The CPU 72 controls the entertainment apparatus 12 in its entirety by executing the operating system stored in the ROM 78. The CPU 72 comprises a 32-bit RISC-CPU, for example.

When the entertainment apparatus 12 is turned on, the CPU 72 executes the operating system stored in the ROM 78 to start controlling the graphic generating system 64, the sound generating system 66, etc.

When the operating system is executed, the CPU 72 initializes the entertainment apparatus 12 in its entirety for confirming its operation, and thereafter controls the optical disc control system 68 to execute an application program such as a game program recorded in the optical disk 20.

As the application program such as a game program is executed, the CPU 72 controls the graphic generating system 64, the sound generating system 66, etc. depending on commands entered from the user for thereby controlling the display of images and the generation of music sounds and sound effects.

The graphic generating system 64 comprises a geometry transfer engine (GTE) 80 for performing coordinate transformations and other processing, a graphic processing unit (GPU) 82 for rendering image data according to instructions from the CPU 72, a frame buffer 84 for storing image data rendered by the GPU 82, and an image decoder 86 for decoding image data compressed and encoded by an orthogonal transform such as a discrete cosine transform.

The GTE 80 has a parallel arithmetic mechanism for performing a plurality of arithmetic operations parallel to each other, and can perform coordinate transformations and light source calculations, and calculate matrixes or vectors at a high speed in response to a request from the CPU 72.

Specifically, the GTE 80 can calculate the coordinates of a maximum of 1.5 million polygons per second for a flat shading process to plot one triangular polygon with one color, for example. With the GTE 80, the entertainment apparatus 12 is able to reduce the burden on the CPU 72 and perform high-speed coordinate calculations.

According to an image generating instruction from the CPU 72, the GPU 82 generates and stores the data of a polygon or the like in the frame buffer 84. The GPU 82 is capable of generating and storing a maximum of 360 thousand polygons per second.

The frame buffer 84 comprises a dual-port RAM, and is capable of simultaneously storing image data generated by the GPU 82 or image data transferred from the main memory 76, and reading image data for display. The frame buffer 84 has a storage capacity of 1 Mbytes, for example, and is handled as a 16-bit matrix made up of a horizontal row of 1024 pixels and a vertical column of 512 pixels.

The frame buffer 84 has a display area for storing image data to be outputted as video output data, a CLUT (color look-up table) area for storing a color look-up table which will be referred to by the GPU 82 when it renders a polygon or the like, and a texture area for storing texture data to be subjected to coordinate transformations when a polygon is generated and mapped onto a polygon generated by the GPU 82. The CLUT area and the texture area are dynamically varied as the display area is varied.

The GPU 82 can perform, in addition to the flat shading process, a Gouraud shading process for determining colors in polygons by interpolating intensities from the vertices of the polygons, and a texture mapping process for mapping textures stored in the texture area onto polygons. For performing the Gouraud shading process or texture mapping process, the GTE 80 can perform coordinate calculations for a maximum of about 500,000 polygons per second.

The image decoder 86 is controlled by the CPU 72 to decode image data of a still or moving image stored in the main memory 76, and store the decoded image into the main memory 76.

Image data reproduced by the image decoder 86 is transferred to the frame buffer 84 by the GPU 82, and can be used as a background for an image plotted by the GPU 82.

The sound generating system 66 comprises a sound processing unit (SPU) 88 for generating music sounds, sound effects, etc. based on instructions from the CPU 72, and a sound buffer 90 for storing music sounds, sound effects, etc. generated by the SPU 88. Audio signals representing music sounds, sound effects, etc. generated by the SPU 88 are supplied to audio terminals of the monitor 18. The monitor 18 has a speaker 92 which radiates music sounds, sound effects, etc. generated by the SPU 88 based on the supplied audio signals.

The SPU 88 has an ADPCM (adaptive differential PCM) function for reproducing 16-bit sound data which has been encoded as 4-bit differential sound data by ADPCM, a reproducing function for reproducing waveform data stored in the sound buffer 90 to generate sound effects, etc., and a modulating function for modulating and reproducing the waveform data stored in the sound buffer 90.

The sound system 66 with these functions can be used as a sampling sound source which generates music sounds, sound effects, etc. based on the waveform data stored in the sound buffer 90 according to instructions from the CPU 72.

The optical disk control system 68 comprises an optical disk drive 70 for reproducing application programs and data recorded on the optical disk 20, a decoder 94 for decoding programs and data that are recorded with an error correcting code added thereto, and a buffer 96 for temporarily storing data read from the optical disk drive 70 so as to allow the data from the optical disk 20 to be read at a high speed. An auxiliary CPU 98 is connected to the decoder 94.

Sound data recorded on the optical disk 20 which is read by the optical disk drive 70 includes PCM data converted from audio signals, in addition to the ADPCM data.

The ADPCM data, which is recorded as 4-bit differential data of 16-bit digital data, is decoded by the decoder 94, supplied to the SPU 88, converted thereby into audio data, and applied to drive the speaker 92.

The PCM data, which is recorded as 16-bit digital data, is decoded by the decoder 94 and then applied to drive the speaker 92.

Figure 7:
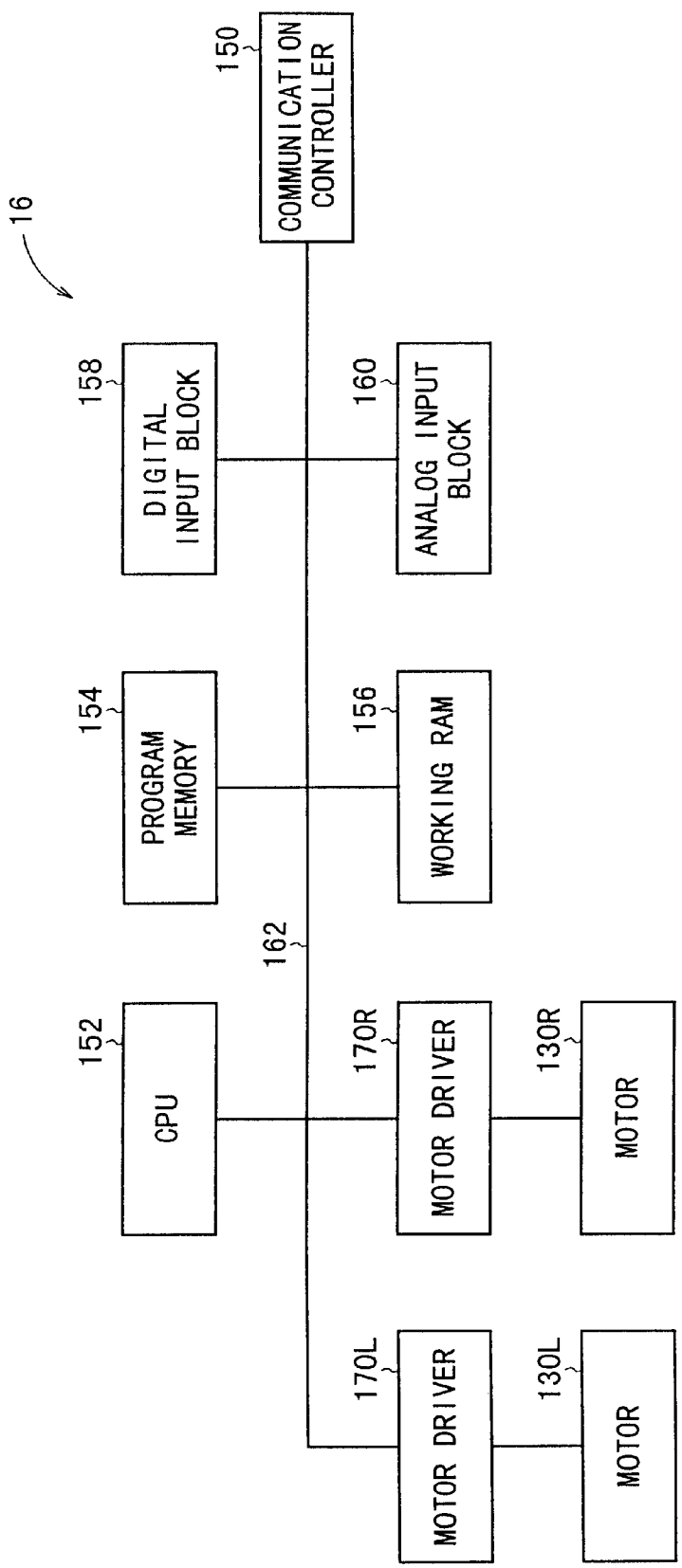
FIG. 7 is a block diagram of the manual controller.

As shown in FIG. 7, the manual controller 16 comprises a communication controller 150, a CPU 152, a program memory 154, a working RAM 156, a digital input block 158, an analog input block 160, a left motor driver 170L for energizing the left motor 130L, and a right motor driver 170R for energizing the right motor 130R. These components of the manual controller 16 are connected to a bus 162.

The digital input block 158 functions as a manual input controller for the pressable control members 110a–110d of the first control pad 34 and the pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 58 (see FIG. 6) of the entertainment apparatus 12, for example, for data communications with the entertainment apparatus 12.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a pair of motor drivers 170R, 170L for energizing the motors 130R, 130L of the vibration imparting mechanisms 128R, 128L. Each of the motors 130R, 130L is energized by a voltage and a current supplied from the motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the entertainment apparatus 12 and the manual controller 16. Other detailed structure of the entertainment apparatus 12 are omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. This cable further includes a power line 172 extending from a power supply in the entertainment apparatus 12 and connected to the motor drivers 170R, 170L in the manual controller 16 for supply electric energy to energize the motors 130R, 130L.

A process of bidirectional serial communication between the entertainment apparatus 12 and the manual controller 16 will be described below. In order for the entertainment apparatus 12 to communicate with the manual controller 16 to read control data from the digital input block 158 and the analog input-block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends control data from the digital input block 158 and the analog input block 160 via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data from the digital input block 158 and the analog input block 160 to the entertainment apparatus 12, and the entertainment apparatus 12 can send vibration generating commands for energizing the motors 130R, 130L of the vibration imparting mechanisms 128R, 128L via the data transfer signal line TXD to the manual controller 16.

The vibration generating commands for energizing the motors 130R, 130L include those which have been established in advance in the optical disk 20 set in the entertainment apparatus 12 and those which are newly generated in the entertainment apparatus 12.

A characteristic function of the entertainment system 10 according to the present embodiment will be described below with reference to FIGS. 9 through 23.

According to the characteristic function, a relatively moving object 200 (see FIG. 10) is displayed on at least one track displayed on the display monitor 18, and the user tries to acquire the object 200 with a control input entered by the user. When the acquisition of the object 200 with the control input is detected, a sound assigned to the track on which the object 200 has relatively moved is outputted.

Figure 9:
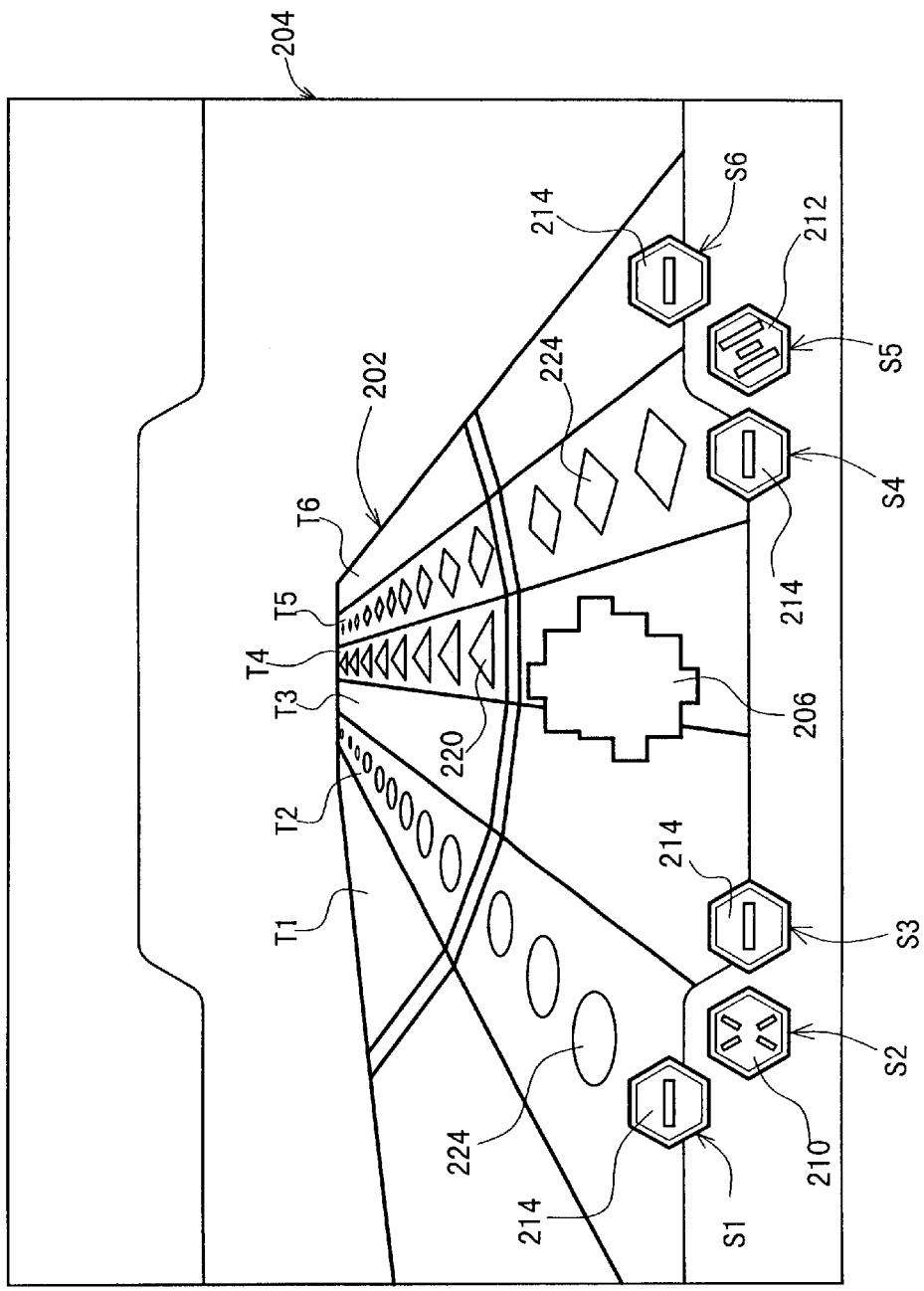
FIG. 9 is a view showing a trial view which displays an acquiring object, with an indicator image displayed indicating the coming of an object on a fourth track.

Specifically, as shown in FIG. 9, a trial view 204 simulating an expressway, for example, of a track group 202 of six straight tracks T1–T6 is displayed, and an acquiring object 206 for acquiring the object 200 is displayed in the foreground in the trial view 204. At this time, the acquiring object 206 is displayed as if moving at a high speed on one of the tracks, e.g., the fourth track T4 in FIG. 9.

The trial view 204 includes six symbol display areas S1–S6 displayed in lower left and right regions thereof in association with the respective tracks T1–T6. For example, with respect to the tracks T2, T5 where the object 200 has been acquired, symbol images 210, 212 of sound patterns assigned to the respective tracks T2, T5 are displayed in the symbol display areas S2, S5 associated with the tracks T2, T5. With respect to the tracks T1, T3, T4, T6 where the object 200 has not been acquired, symbol images (initial symbol images) 214 of "–", for example, indicating that the object 200 has not been acquired are displayed in the symbol display areas S1, S3, S4, S6 associated with the tracks T1, T3, T4, T6.

In the example shown in FIG. 9, the initial symbol images 214 are displayed in association with the respective first, third, fourth, and sixth tracks T1, T3, T4, T6 from the left. The symbol image 210 indicative of the assignment of a percussion sound pattern is displayed in association with the second track T2 from the left, and the symbol image 212 indicative of the assignment of a melody/harmony sound pattern is displayed in association with the fifth track T5 from the left.

Figure 10:
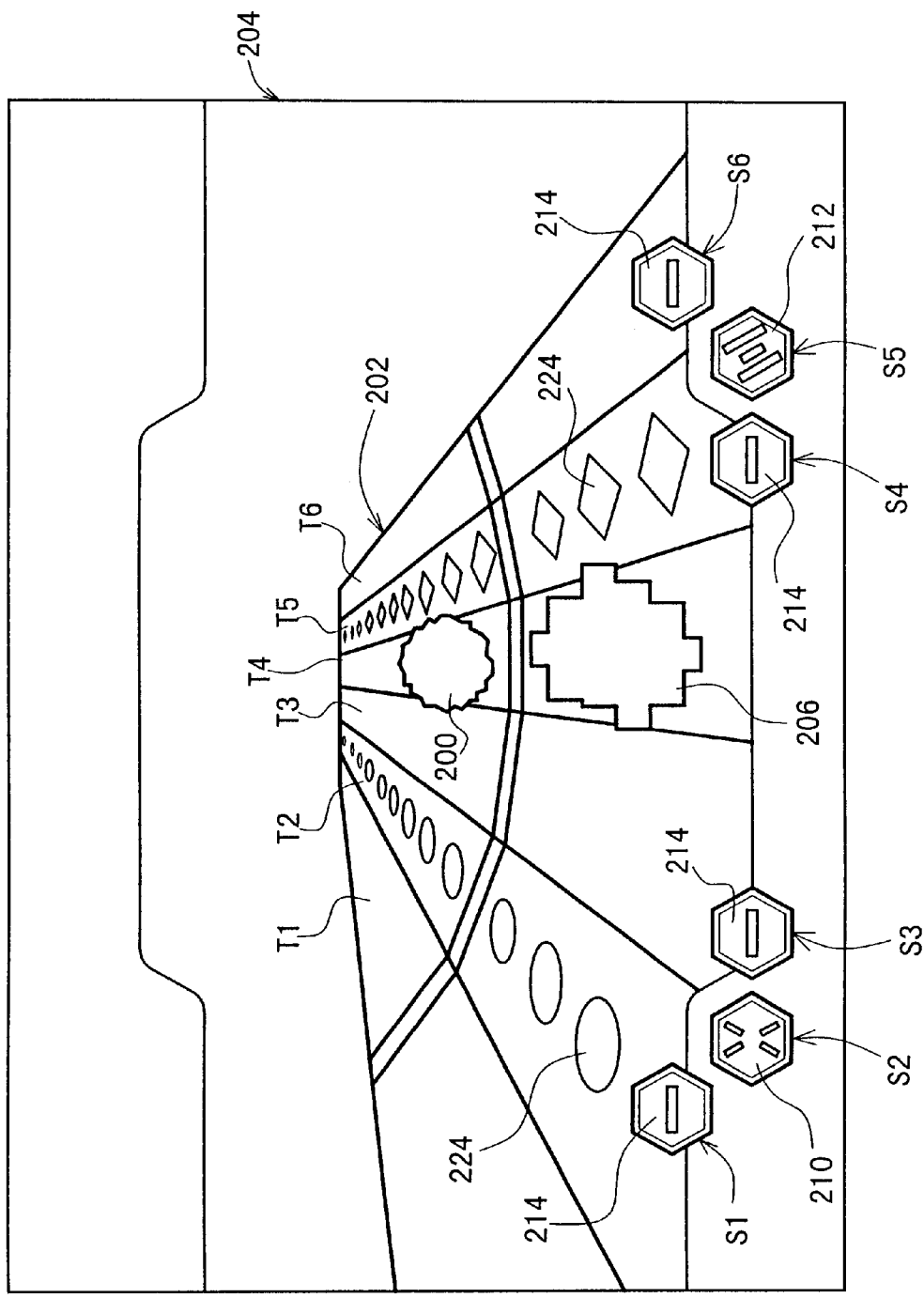
FIG. 10 is a view showing the trial view indicating the coming of the object on the fourth track.

Then, an indicator image 220 of an array of triangles is displayed on a track where the object 200 is coming, i.e., the fourth track T4. Thereafter, as shown in FIG. 10, the object 200 appears on the track T4.

By positioning the acquiring object 206 on the track, i.e., the fourth track T4, where the indicator image 220 is displayed, the acquiring object 206 is going to hit the object 200 positioned on the track T4. Stated otherwise, the object 200 positioned on the track T4 relatively moves with respect to the acquiring object 206, i.e., moves toward the acquiring object 206.

Figure 11:
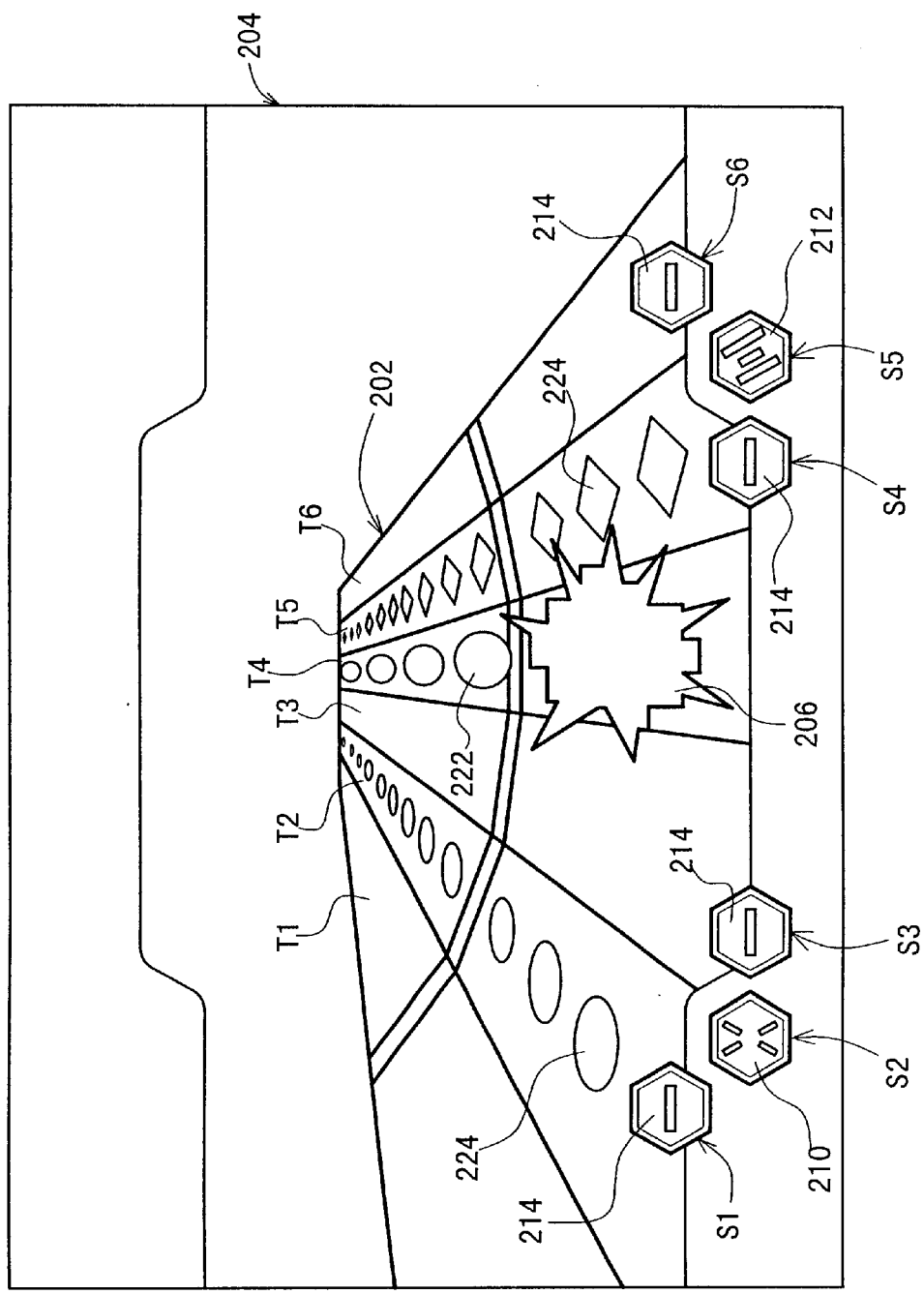
FIG. 11 is a view showing the trial view indicating the acquisition by the acquiring object of the object on the fourth track.

As shown in FIG. 11, when the distance between the acquiring object 206 and the object 200 relatively moving thereto falls in a predetermined range, the user presses the control member 112d, functioning as a decision button, to acquire the object 200.

Different sound patterns are assigned respectively to the tracks T1–T6. When the object 200 is acquired, the sound pattern assigned to the corresponding track T4 is selected. At this time, of the six displayed symbol images, the symbol image associated with the track T4 where the object 200 is acquired changes from the initial symbol image 214 to the symbol image indicative of the sound pattern assigned to the track T4, i.e., the symbol image 212 indicative of the melody/harmony sound pattern.

The actual sound pattern is outputted when at least one light spot 222 that appears following the object 200 is acquired, as shown in FIG. 11. The light spot 222 can be acquired by positioning the acquiring object 206 on the track T4 where the object 200 is presently acquired. When acquired by the acquiring object 206, the light spot 222 changes to a mark image 224 (see the tracks T2, T5) which is of an elliptical or lozenge shape.

After the sound pattern has been outputted for one track, the user moves the acquiring object 206 to another track. In this manner, a maximum of six sound patterns can be outputted. These sound patterns are synchronously outputted to complete a piece of music.

At this stage, an evaluation is made. The evaluation is based on the accumulation of distances between the acquiring object 206 and objects 200 relatively moving with respect to the acquiring object 206 at the time a certain control input is entered. The evaluation is higher as the accumulated value of distances is smaller. The evaluation is displayed on the display monitor 18.

At the same time that the evaluation is displayed, an image of the track group 202 seen from above may be displayed on the display monitor 18. Depending on the evaluation, the color of the acquiring object 206 may be changed from green to yellow to red to gray, for example.

Figure 12:
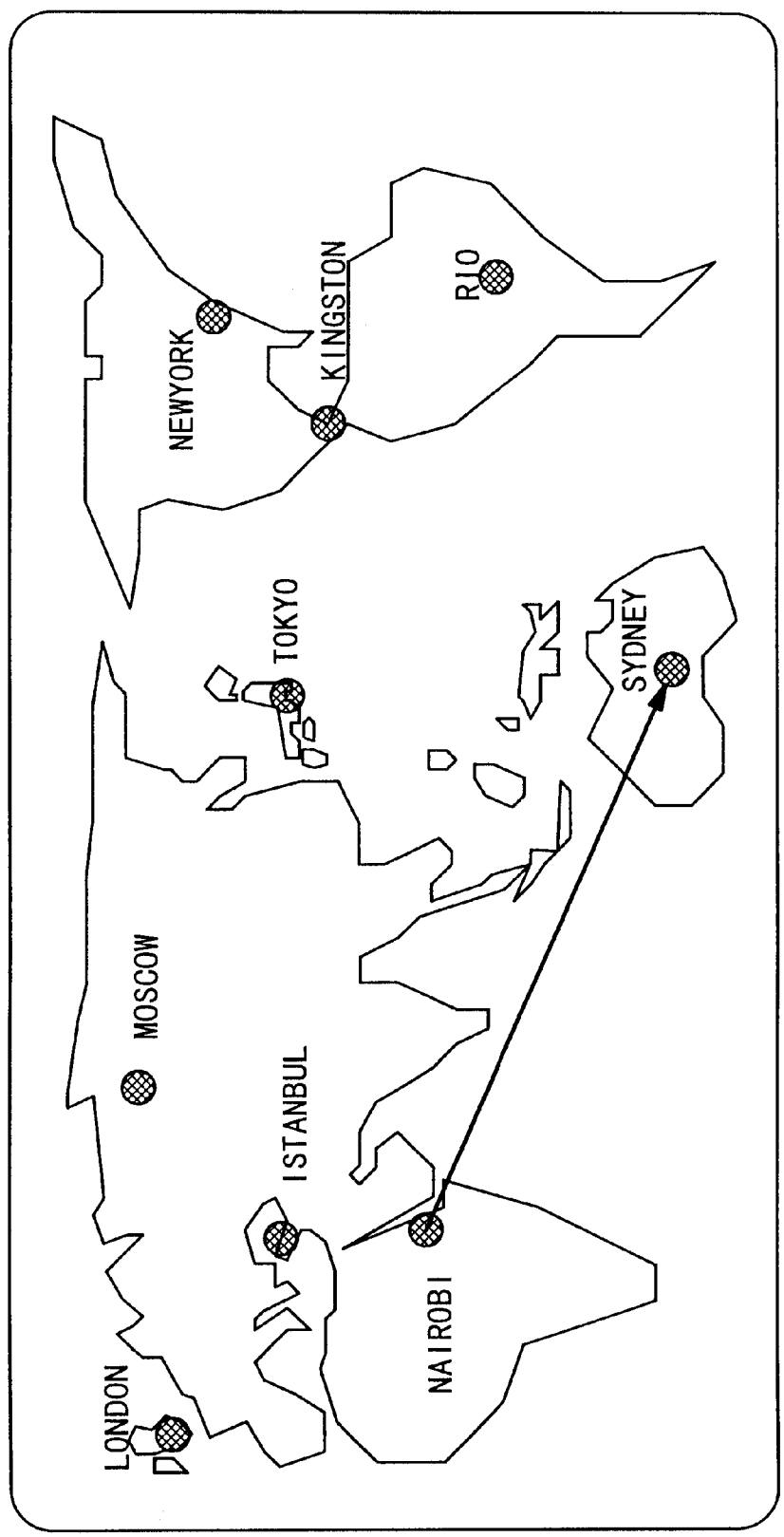
FIG. 12 is a view showing the layout of terminals of various countries.

If the above function is realized as a video game, then, as shown in FIG. 12, a scenario of such a video game may be created for making a circular tour of terminals in nine countries while enjoying pieces of music inherent in those countries. The video game incorporating the above function is much fun for the user to play.

The video game may be designed such that in the terminal of each of the countries, the user is required to try three tasks, for example, and when the user has completed all the tasks, the user can challenge the next terminal.

The video game is made more enjoyable by displaying an image inherent in the country of the terminal that the user is staying, around the track group 202 displayed on the display monitor 18. When a sound pattern is outputted, the manual controller 16 may be vibrated by the vibration imparting mechanisms 128L, 128R in synchronism with the sound pattern.

Figure 13:
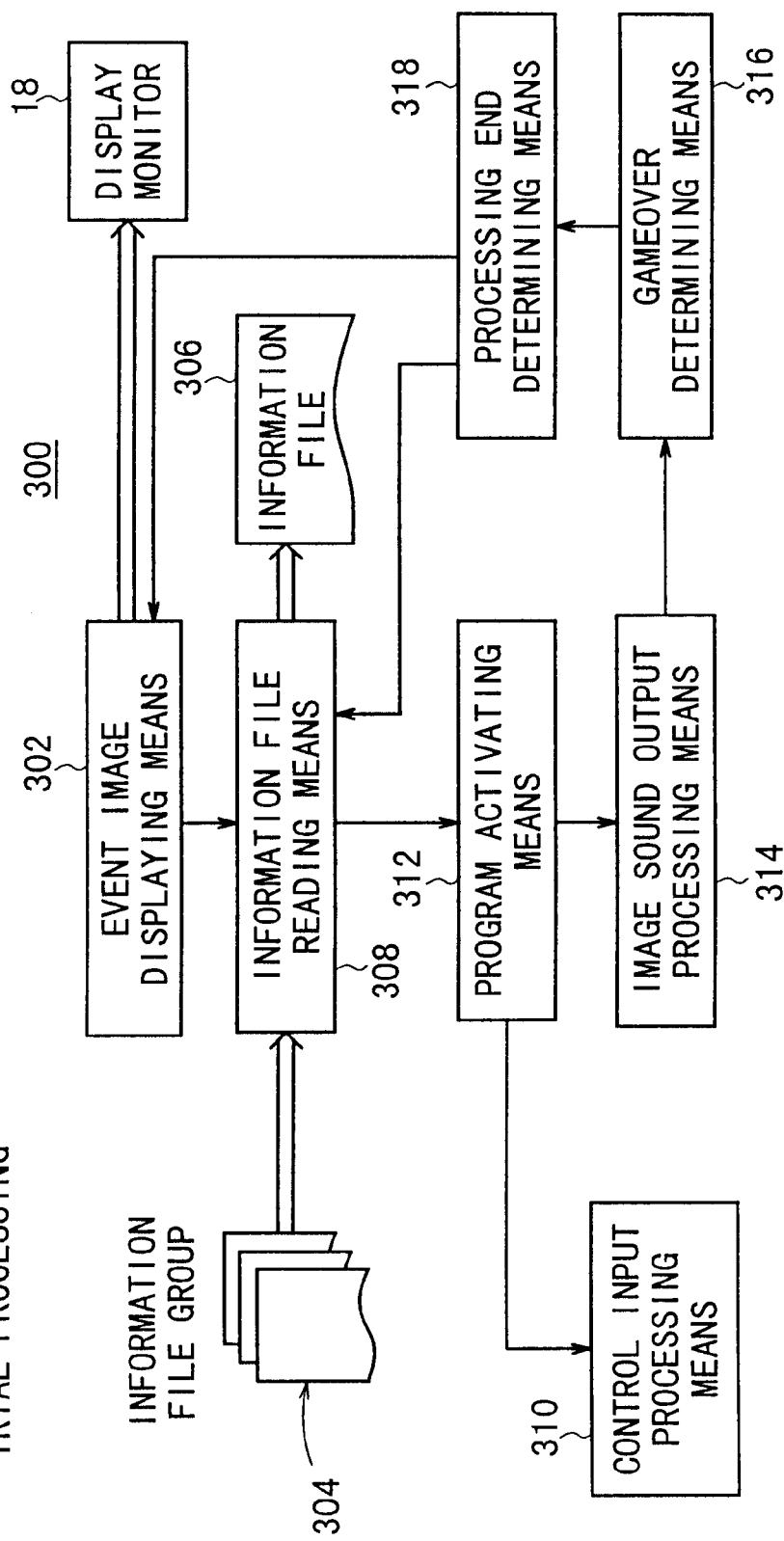
FIG. 13 is a functional diagram of a sound presentation trial processing means.

One example of software for performing the above characteristic function will be described below with reference to FIGS. 13 through 23. As shown in FIG. 13, the software comprises a sound presentation trial processing means 300.

The sound presentation trial processing means 300 is supplied to the entertainment apparatus 10 from a randomly accessible recording medium such as a CD-ROM or a memory card 14, or via a network. It is assumed here that the sound presentation trial processing means 300 is read into the main memory 76 from the optical disk 20 such as a CD-ROM.

The sound presentation trial processing means 300 is downloaded in advance from the optical disk 20 played back by the entertainment apparatus 12 into the main memory 76 in the control system 60 thereof according to a predetermined process, and executed by the CPU 72 of the control system 60.

As shown in FIG. 13, the sound presentation trial processing means 300 comprises an event image displaying means 302 for displaying an image of an event depending on each scene on the display monitor 18, an information file reading means 308 for reading an information file 306 from an information file group 304, a program activating means 312 for activating a control input processing means 310, an image sound output processing means 314 for changing the image of the object 200 when the acquisition of the object 200 is detected and outputting a sound according to a predetermined control action, a gameover determining means 316 for determining whether gameover processings have been performed or not, and a processing end determining means 318 for determining whether various processings have been ended or not.

Figure 14:
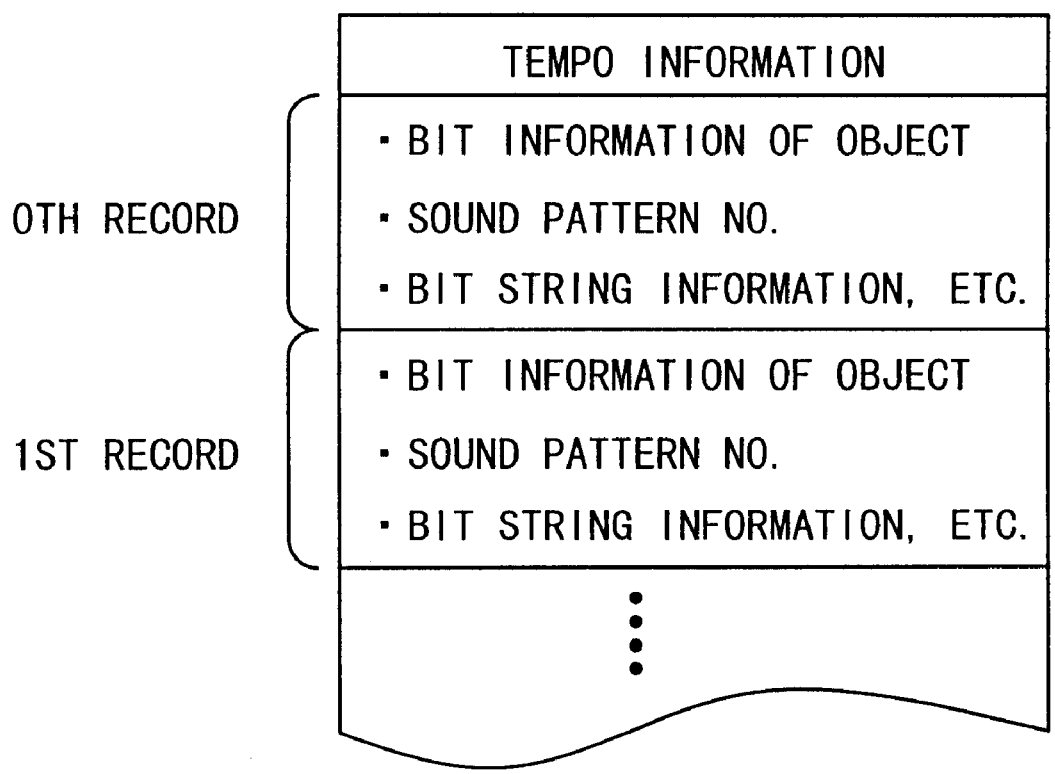
FIG. 14 is a diagram showing details of an information table.

The information file group 304 comprises an array of information files 306 for each terminal of a country. As shown in FIG. 14, each of the information files 306 stores a performance rate (tempo) of sound patterns in its leading end and also stores six records associated with the respective tracks T1–T6. Each of the records stores bit information of the object 200, a sound pattern number, bit string information, etc.

The bit string information represents the output time (e.g., 4 seconds) of a sound pattern which is divided by a string of 48 bits. The information of each bit indicates the outputting or non-outputting of the sound pattern; "1" representing the outputting of the sound pattern and "0" representing the non-outputting of the sound pattern.

The bit information of the object 200 represents bit information, of the above bit string information, indicative of the appearance of the object 200. The bit information of the object 200 comprises the bit numbers of leading ends of respective trains of consecutive bits "1".

Specifically, if the bit train information comprises "1111111100001111100000111 . . ." from LSB to MSB, then the bit information of the object 200 comprises "0th bit", "13th bit", "24th bit".

The sound pattern number represents the address of an array variable area where a sound pattern, from a sound pattern group stored in the sound buffer 90, is to be outputted.

When the SPU 88 receives the sound pattern number, the SPU 88 reads a corresponding sound pattern from the sound buffer 90. Under the control of a sound outputting means 352 (see FIG. 15) in the sound presentation trial processing means 300, the SPU 88 outputs the sound pattern at a rate depending on a preset tempo to the speaker 92 for a period indicated by the bits "1" of the bit string information.

Figure 15:
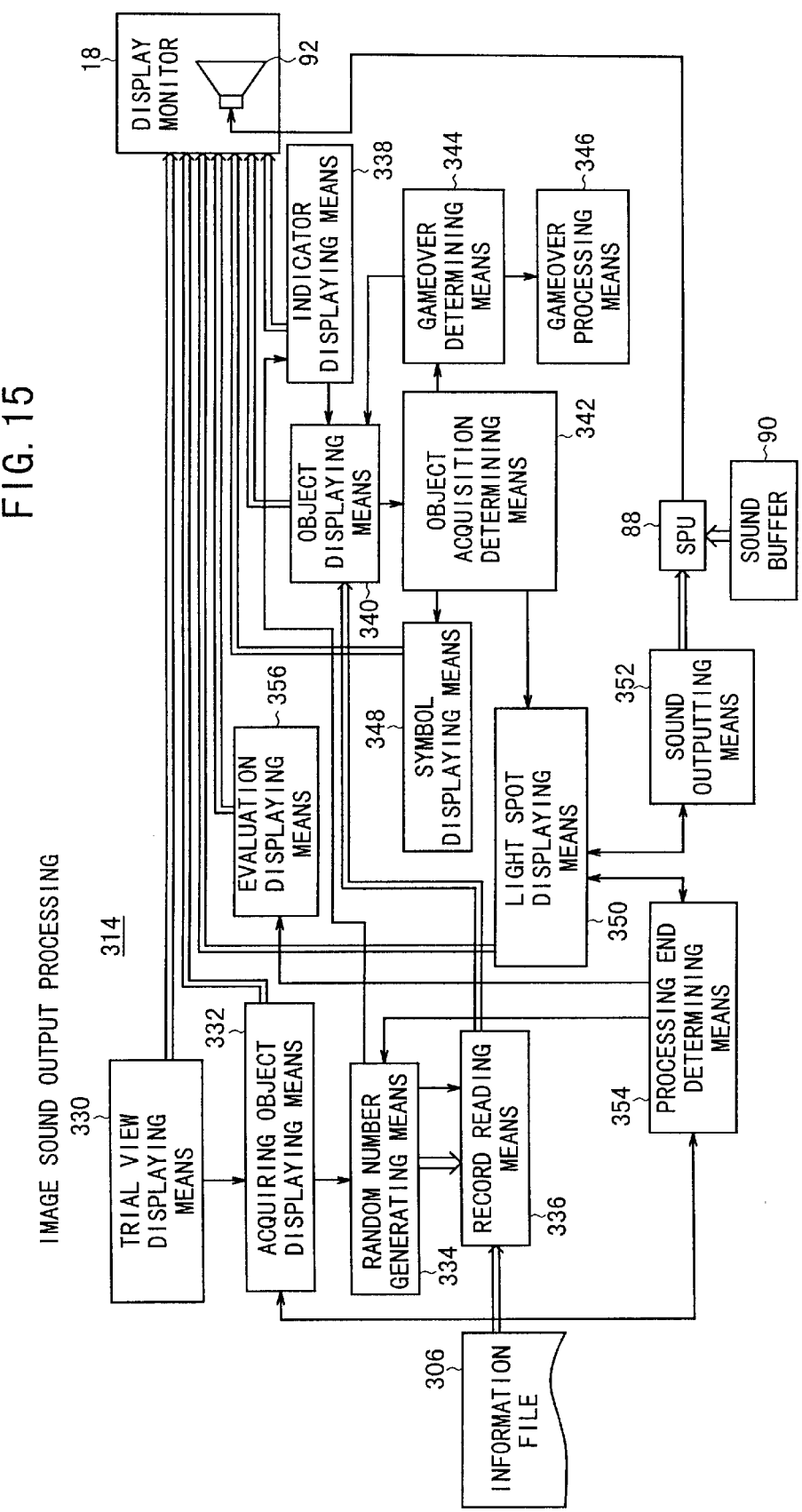
FIG. 15 is a functional diagram of an image sound output processing means.

As shown in FIG. 15, the image sound output processing means 314 comprises a trial view displaying means 330 for displaying a trial view 204 to acquire the object 200 to present a sound, an acquiring object displaying means 332 for displaying an acquiring object 206 in the trial view 204, a random number generating means 334 for determining a track where the object 200 is to appear, a record reading means 336 for reading a record from the information file 306, an indicator displaying means 338 for displaying an indicator image 220 that represents the coming of the object 200, an object displaying means 340 for displaying the image of the object 200 on the determined track, an object acquisition determining means 342 for determining whether the object 200 has been acquired or not, a gameover determining means 344 for determining whether a gameover is reached or not, and a gameover processing means 346 for displaying an image indicative of a gameover, for example.

The image sound output processing means 314 also comprises a symbol displaying means 348 for displaying a symbol image indicative of a sound pattern assigned to the object 200 which has been acquired, in the corresponding symbol display area, a light spot displaying means 350 for displaying a string of ON bits, i.e., bits "1", related to the acquired object 200, i.e., a related string of bits, in relative motion as a string of light spots 222, a sound outputting means 352 for outputting a sound assigned to light spots 222 (bits) that have reached the acquiring object 206, a processing end determining means 354 for determining whether various processings have been ended or not, and an evaluation displaying means 356 for displaying an evaluation about a present trial.

Figure 16:
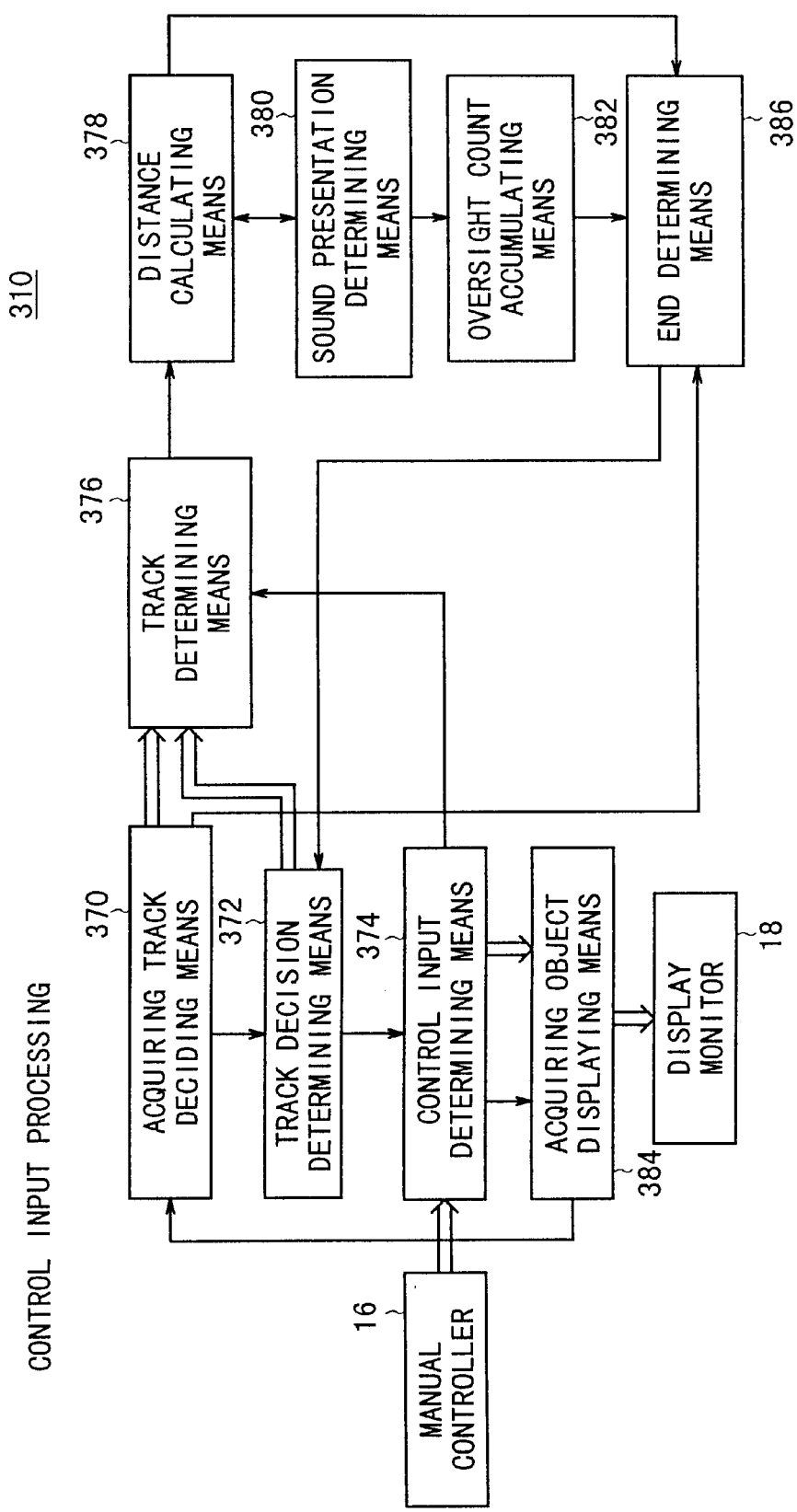
FIG. 16 is a functional diagram of a control input processing means.

As shown in FIG. 16, the control input processing means 310 that is activated via the sound presentation trial processing means 300 comprises an acquiring track deciding means 370 for deciding a track on which the acquiring object 206 is moving, a track decision determining means 372 for determining whether a track on which the object 200 is coming has been decided or not, a control input determining means 374 for determining a control input from the manual controller 16, a track determining means 376 for determining agreement between the track on which the acquiring object 206 is moving and the track on which the object 200 is coming, a distance calculating means 378 for calculating the distance between the acquiring object 206 and an object 200 that is closest to the acquiring object 206, a sound presentation determining means 380 for determining whether a condition to present a sound has been satisfied or not, an oversight count accumulating means 382 for accumulating an oversight count to decide a gameover, an acquiring object displaying means 384 for displaying the acquiring object 206 in motion based on control inputs from direction buttons (including the joysticks 44, 46), and an end determining means 386 for determining an end request for the control input processing means 310.

The control input processing means 310 operates in a multitasking fashion under the management of the sound presentation trial processing means 300.

A processing sequence of the sound presentation trial processing means 300 will be described below with reference to FIGS. 17 through 23.

Figure 17:
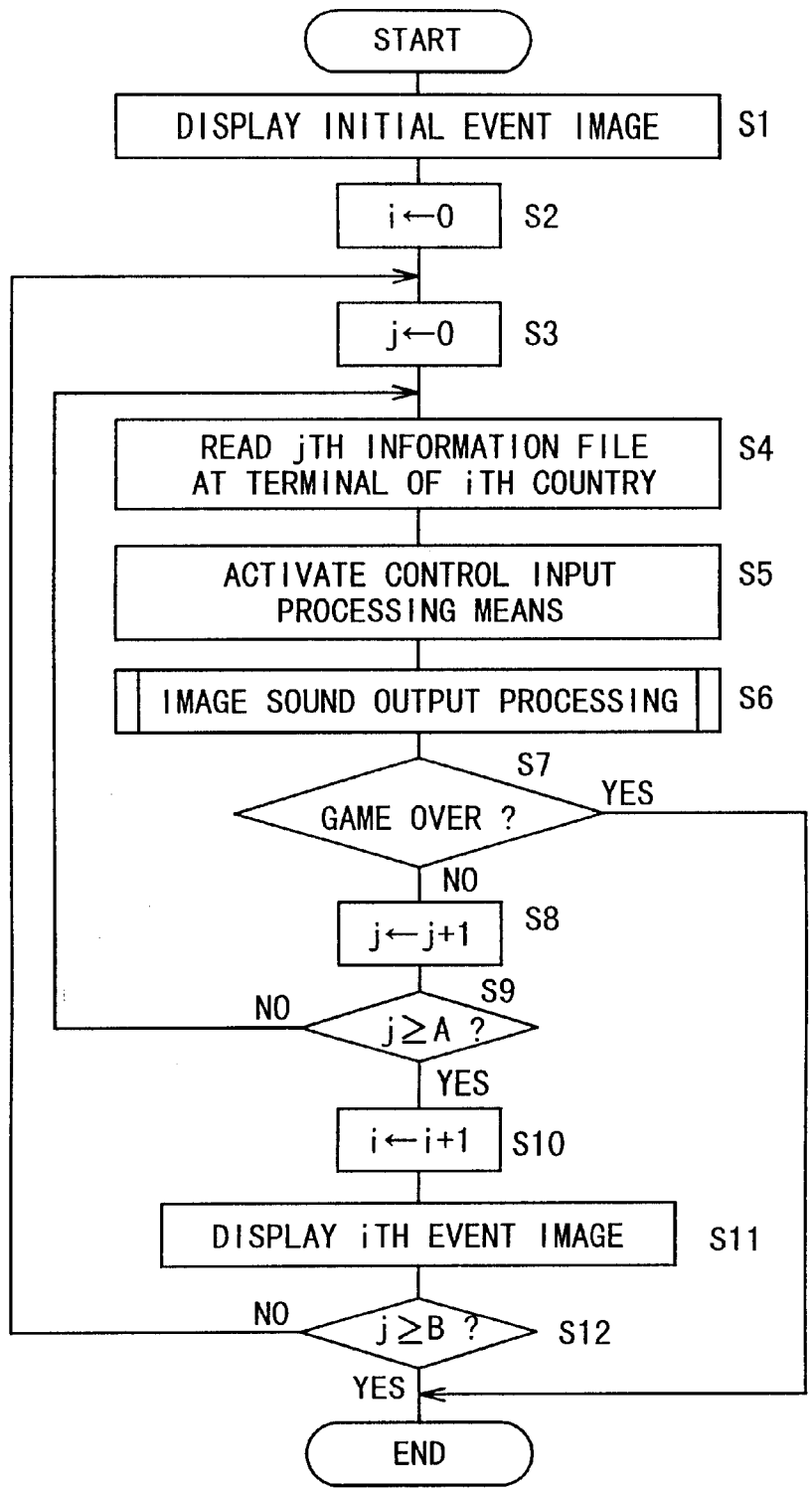
FIG. 17 is a flowchart of a processing sequence of the sound presentation trial processing means.

In step S1 shown in FIG. 17, the sound presentation trial processing means 300 displays an initial event image on the display monitor 18. The initial event image may be an image for guidance to the terminal of a first country or an explanation of how to use the manual controller 16.

In step S2, the sound presentation trial processing means 300 stores an initial value "0" in an index register i used to retrieve terminals, thus initializing the index register i. In step S3, the sound presentation trial processing means 300 stores an initial value "0" in an index register j used to update a trial count in each terminal, thus initializing the index register j.

In step S4, the information file reading means 308 reads a jth information file 306 in the terminal of an ith country that is recorded in the optical disk 20, for example.

In step S5, the program activating means 312 activates the control input processing means 310. In step S6, the image sound output processing means 314 performs its own processing sequence.

The processing sequence of the image sound output processing means 314 will be described below with reference to FIGS. 18 through 21.

Figure 18:
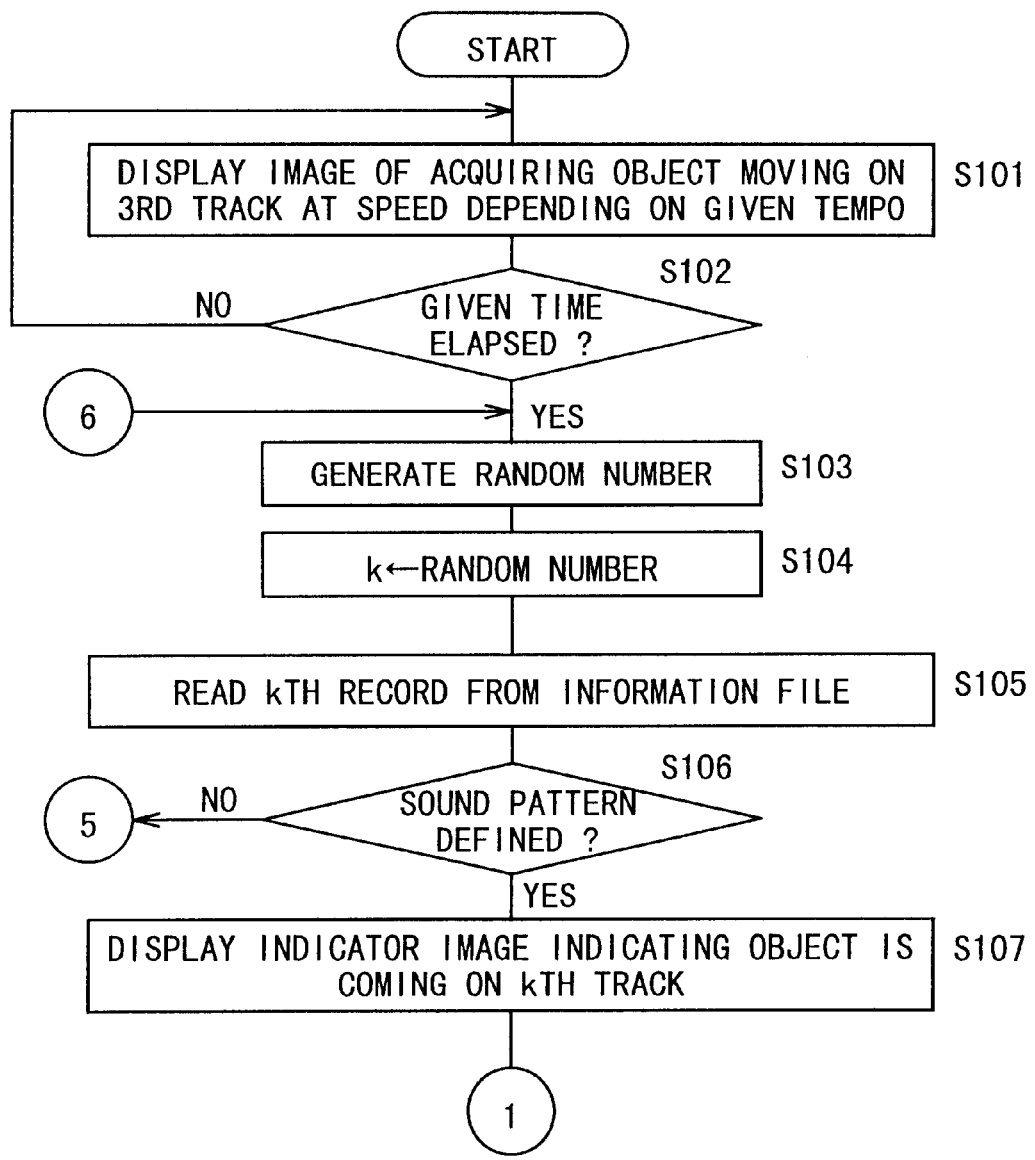
FIGS. 18 through 21 are a flowchart of a processing sequence of image sound output processing means.

In step S101 shown in FIG. 18, the trial view displaying means 330 displays a trial view 204 including a track group 202 of six tracks T1–T6 on the display monitor 18, and the acquiring object displaying means 332 displays an image in which an acquiring object 206 is moving on one track, e.g., the third track T3, at a speed depending on a preset tempo, in the trial view 204. Information relative to the tempo is registered in the leading end of the information file 306 that has been read.

In step S102, the image sound output processing means 314 determines whether a predetermined time, e.g., 2 seconds, has elapsed or not. If the predetermined time has elapsed, control goes to step S103 in which the random number generating means 334 generates a random number with respect to a track number which has not been decided, of the track numbers "1"–"6".

In step S104, the image sound output processing means 314 stores the generated random number in an index register k used to retrieve records in the information file 306. In step S105, the record reading means 336 reads a kth record from the information file 306.

In step S106, the image sound output processing means 314 determines whether the contents of the read kth record are valid or invalid, i.e., whether a sound pattern is defined in the track corresponding to the read kth record or not.

If a sound pattern is defined in the track, then control proceeds to step S107 in which the indicator displaying means 338 displays an indicator image 220 indicating that the object 200 is coming on the kth track, as shown in FIG. 9. In the example shown in FIG. 9, the indicator image 220 is displayed on the fourth track T4.

Figure 19:
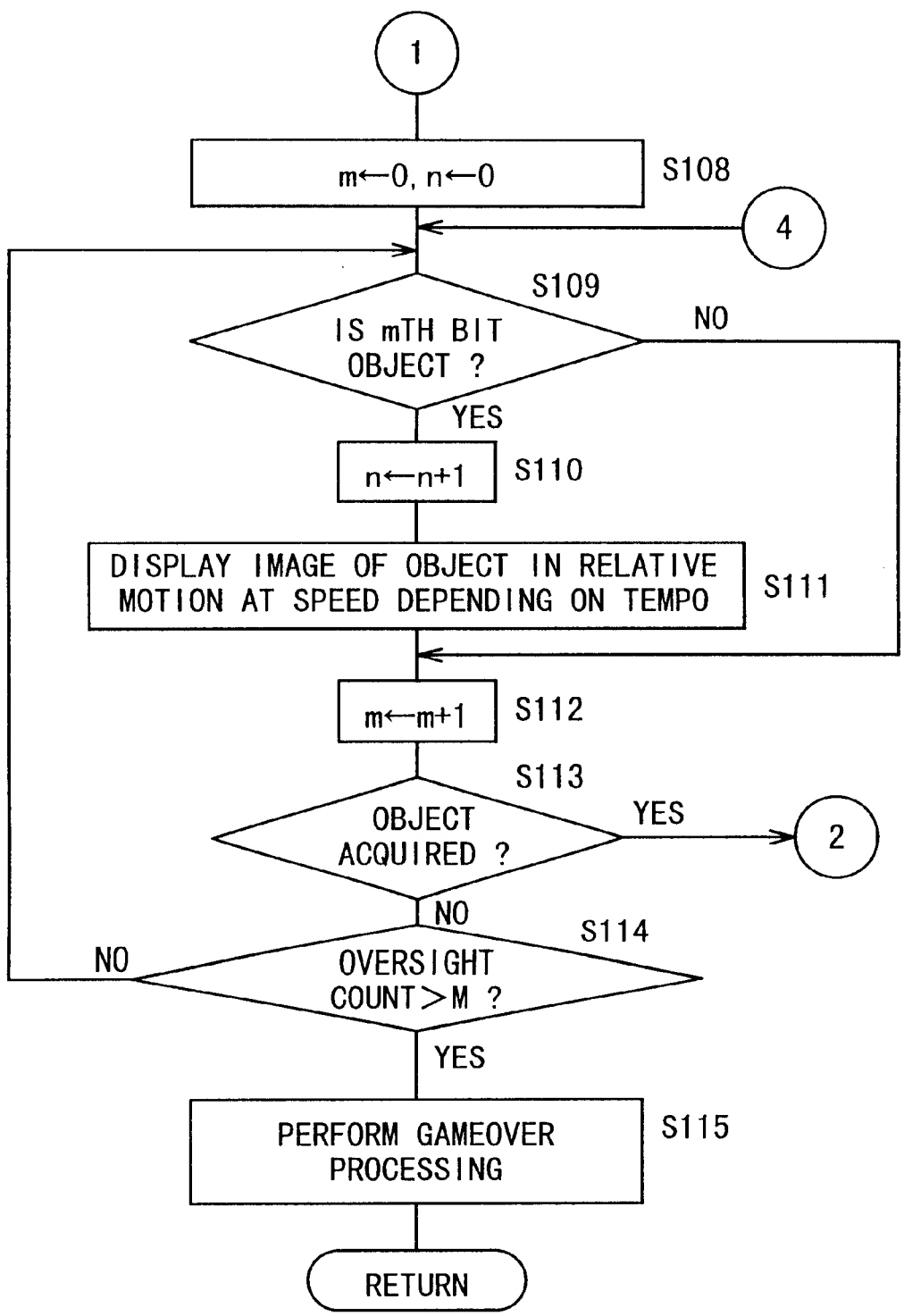
Figure 20:
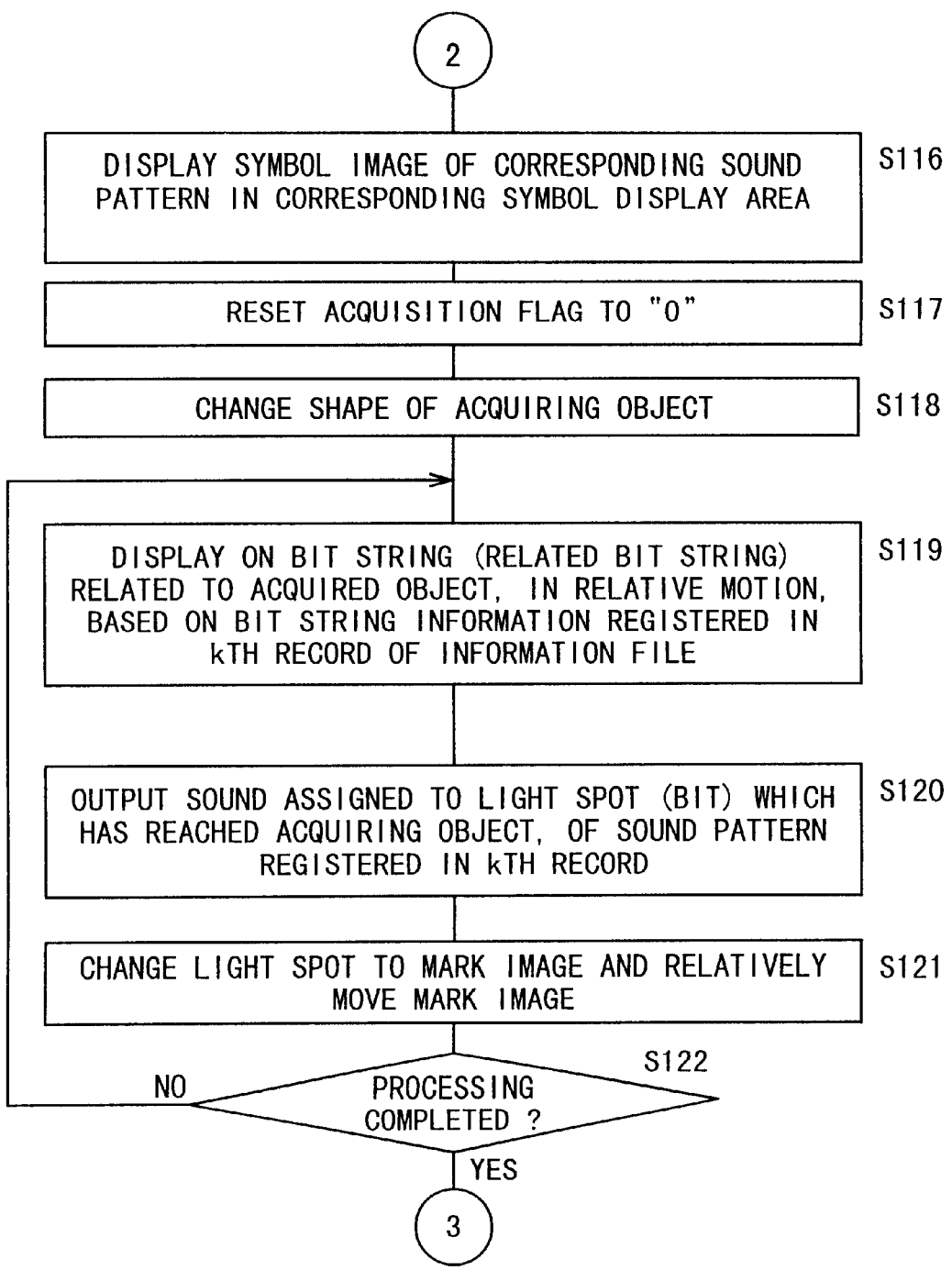

In step S108 shown in FIG. 19, the image sound output processing means 314 stores an initial value "0" in each of an index register m used to retrieve bit strings and an index register n used to retrieve objects 200, thereby initializing these index registers m, n.

In step S109, the object displaying means 340 determines whether an mth bit of the bit string information registered in the present record is related to the object 200 or not, by determining whether the value of the index register m agrees with one of the bit information of the object 200 registered in the record.

If the mth bit of the bit string information is related to the object 200, then control goes to step S110 in which the image sound output processing means 314 increments the value of the index register n by +1. In step S111, the object displaying means 340 displays the image of the object 200 in relative motion at a speed depending on the preset tempo.

After the processing in step S111 or if the mth bit of the bit string information is not related to the object 200 in step S109, then control goes to step S112 in which the image sound output processing means 314 increments the value of the index register m by +1.

In step S113, the object acquisition determining means 342 determines whether the object 200 has been acquired or not, based on an acquisition flag. When the object 200 is acquired, the acquisition flag is set to "1" by the control input processing means 310.

If the acquisition flag is not set to "1" and hence the object 200 is not acquired, then control goes to step S114 in which the gameover determining means 344 determines whether an over sight count, i.e., the number of times an object is overlooked, has exceeded a predetermined value M, e.g., "5", or not.

If the oversight count has exceeded the p redetermined value M, then control goes to step S115 in which the gameover processing means 346 performs various gameover processings, e.g., deletes the trial view 204 and displays a gameover image.

If the oversight count is smaller than the predetermined value M, then control goes back to step S109 for processing a next bit. If an object is acquired in step S113, then control goes to step S116 shown in FIG. 20. In step S116, the symbol displaying means 348 displays a symbol image indicative of a sound pattern assigned to the track in the corresponding symbol display area.

In the example shown in FIG. 11, the object 200 relatively moving on the fourth track T4 is acquired, displaying the symbol image 212 indicative of a melody/harmony sound pattern in the symbol display area S4 which corresponds to the fourth track T4.

In step S117, the image sound output processing means 314 resets the acquisition flag to "0". Thereafter, in step S118, the acquiring object displaying means 332 changes the shape of the acquiring object 206 as shown in FIG. 11.

In step S119, the light spot displaying means 350 displays a string of ON bits, i.e., bits "1", of the bit string information registered in the kth record in the information file 306, related to the acquired object 200, i.e., a related string of bits, in relative motion as a string of light spots 222.

In step S120, the sound outputting means 352 outputs the sound pattern number registered in the kth record in the information file 306 to the SPU 88, and instructs the SPU 88 to output a corresponding sound for a period indicated by the bits corresponding to the light spots 222 acquired by the acquiring object 206, of the bit string information.

When the SPU 88 receives the sound pattern number, the SPU 88 reads a corresponding sound pattern from the sound buffer 90. Then, the SPU 88 outputs the read sound pattern at a rate depending on the preset tempo to the speaker 92 for a period indicated by the bits acquired by the acquiring object 206, of the bit string information.

In step S121, the light spot displaying means 350 displays light spots 222 that have reached the acquiring object 206 as being changed to elliptical or lozenge mark images 224, as indicated on the tracks T2, T5 in FIG. 11.

In step S122, the processing end determining means 354 determines whether a processing on the related bit string with respect to the presently acquired object 200 has been ended or not. If not ended, control goes back to step S112 in which light spots 222 and mark images 224 for a next bit are displayed.

Figure 21:
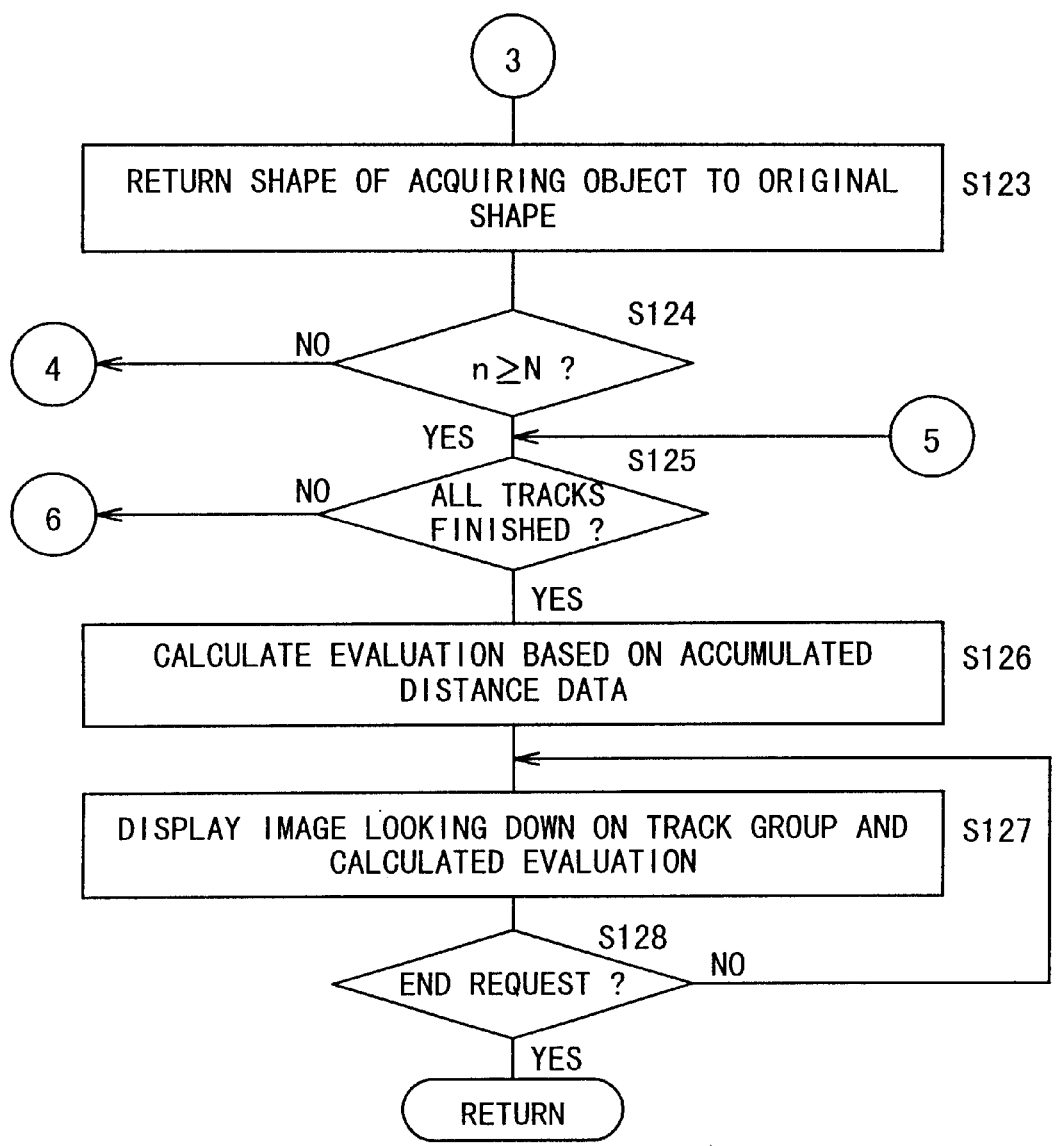

If the processing on the related bit string has been ended, then control goes to step S123 shown FIG. 21. In step S123, the acquiring object displaying means 332 returns the shape of the acquiring object 206 to its original shape, as shown in FIG. 9.

In step S124, the processing end determining means 354 determines whether the processing has been ended for all the objects 200 or not, based on whether or not the value of the index register n is equal to or greater than the number of objects 200 registered in the record.

If the processing has not been ended for all the objects 200, then control goes back to step S109 shown in FIG. 19 to process a next object 200. If the processing has been ended for all the objects 200, or if the record is invalid in step S106 shown in FIG. 18, then control goes to step S125 in which the processing end determining means 354 determines whether the processing has been ended for all the tracks T1–T6 or not.

If the processing has not been ended for all the tracks T1–T6, then control returns to step S103 shown in FIG. 18 to process a next track. If the processing has been ended for all the tracks T1–T6, then control proceeds to step S126 in which the evaluation displaying means 356 calculates a present evaluation based on accumulated distance data. The evaluation is higher as the accumulated distance is shorter.

In step S127, the evaluation displaying means 356 displays an image looking down on the track group 202 and the calculated evaluation. At this time, the acquiring object 206 is displayed in a color depending on the evaluation. For example, the acquiring object 206 is displayed in green if the evaluation ranges from 100% to 76%, yellow if the evaluation ranges from 75% to 51%, red if the evaluation ranges from 50% to 26%, and gray if the evaluation ranges from 25% to 0%.

In step S128, the processing end determining means 354 determines whether there is an end request to end the display of the evaluation. If there is no end request, then control goes back to step S127 to repeat the display of the evaluation. If there is an end request, then the processing sequence of the image sound output processing means 314 is finished.

A processing sequence of the control input processing means 310 will be described below with reference to FIGS. 16, 22, and 23.

Figure 22:
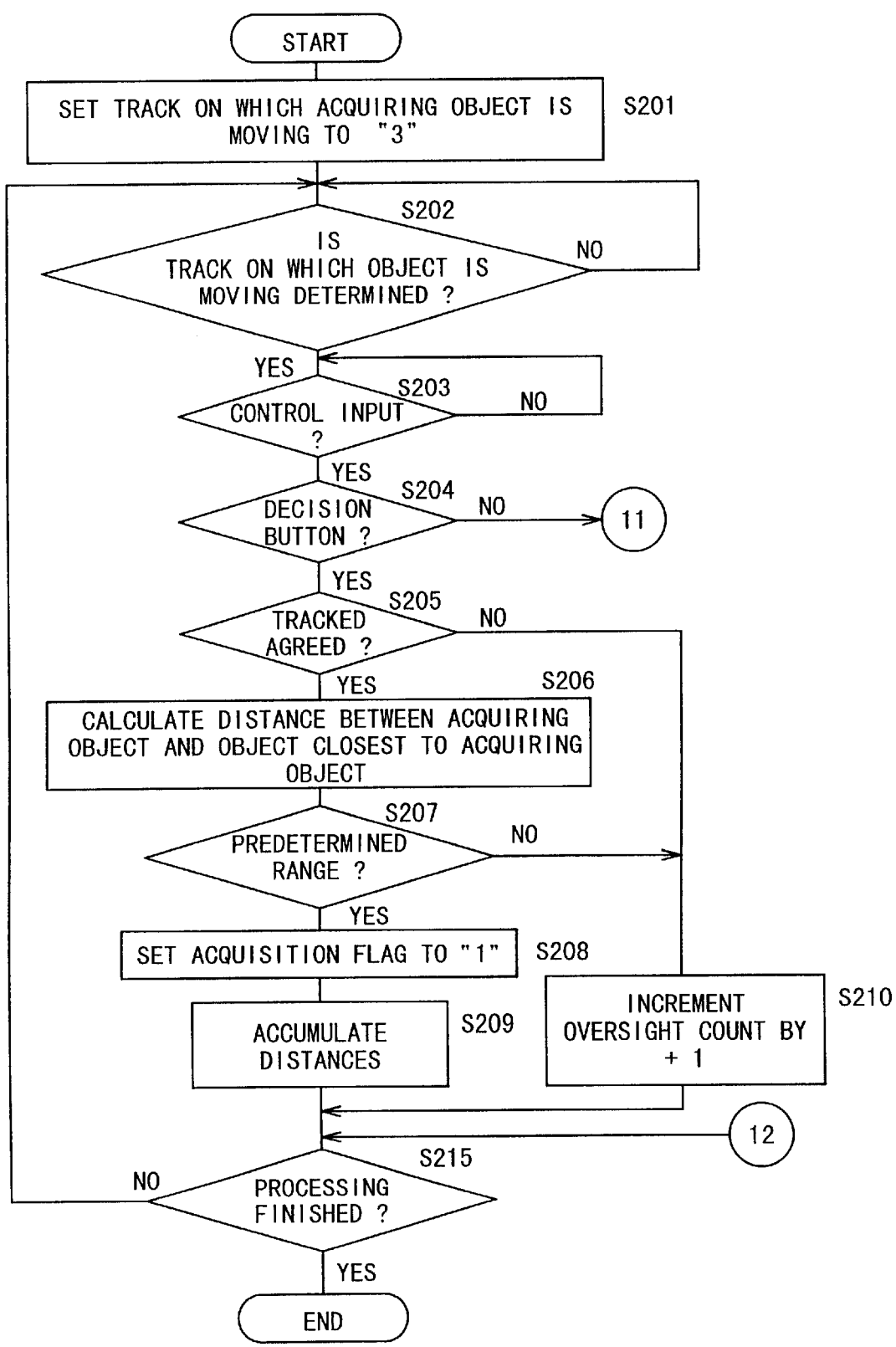
FIGS. 22 and 23 are a flowchart of a processing sequence of the control input processing means.
Figure 23:
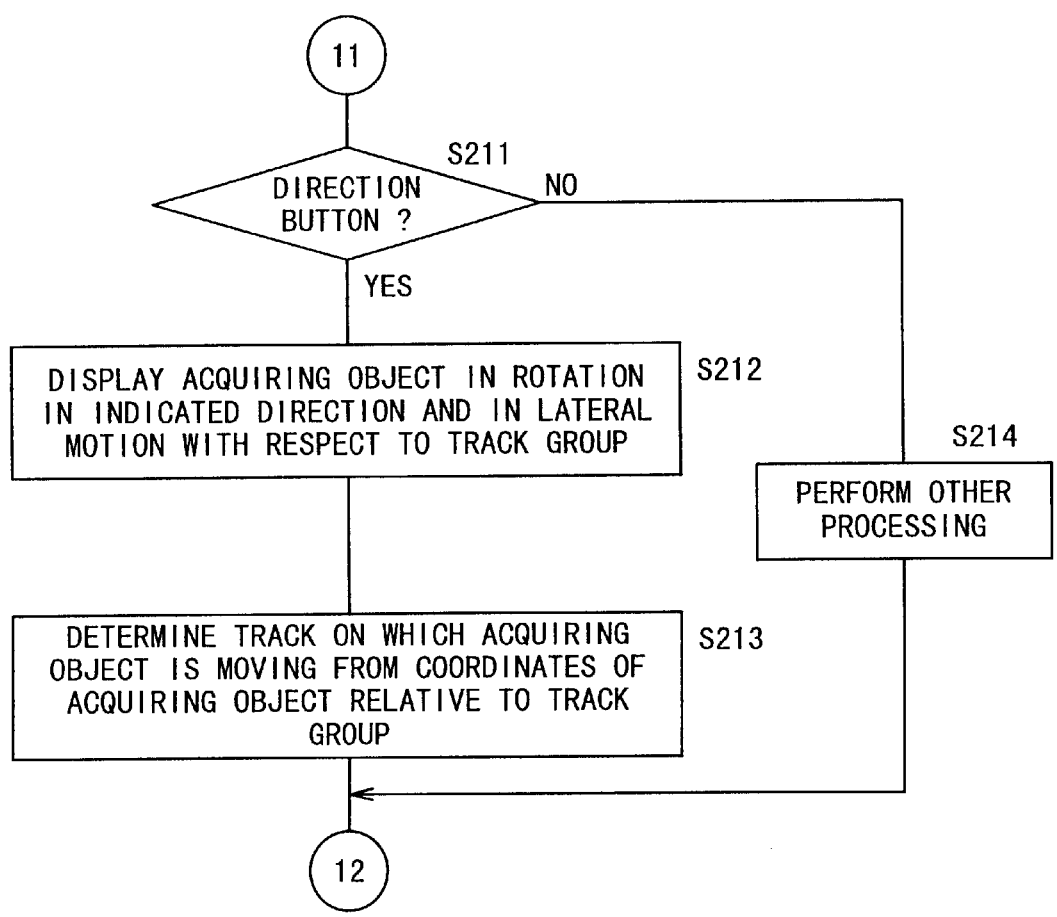

In step S201 shown in FIG. 22, the acquiring track deciding means 370 sets the number of a track on which the acquiring object 206 moves to "3".

In step S202, the track decision determining means 372 determines whether a track on which the object 200 is positioned has been decided or not. Such a track is decided in step S103 carried out by the image sound output processing means 314.

If a track is decided, control proceeds to step S203 in which the control input determining means 374 determines whether there is a control input from the manual controller 16 or not. If there is a control input from the manual controller 16, then control goes to step S204 in which the control input determining means 374 determines whether the control input comes from the decision button 112d or not.

If the control input comes from the decision button 112d, then control goes to step S205 in which the track determining means 376 determines whether the track on which the acquiring object 206 is moving is in agreement with the track on which the object 200 is positioned or not.

If these tracks agree with each other, then control goes to step S206 in which the distance calculating means 378 calculates the distance between the acquiring object 206 and an object 200 that is closest to the acquiring object 206 at the time the decision button 112d is pressed.

In step S207, the sound presentation determining means 380 determines whether a condition to present a sound has been satisfied or not, based on whether the calculated distance falls in a predetermined range or not.

If the calculated distance falls in the predetermined range, then control goes to step S208 in which the control input processing means 310 sets the acquisition flag to "1". In step S209, the distance calculating means 378 accumulates the distances calculated so far.

If the calculated distance does not fall in the predetermined range in step S207, or if the track on which the acquiring object 206 is moving is not in agreement with the track on which the object 200 is positioned in step S205, then control goes to step S210 in which the oversight count accumulating means 382 increments the oversight count by +1.

If the control input does not come from the decision button 112d in step S204, then control goes to step S211 in which the control input determining means 374 determines whether the control input comes from any one of the direction buttons (including the joysticks 44, 46 and the control members 110a–110d) or not.

If the control input comes from a direction button, then control goes to step S212 in which the acquiring object displaying means 384 displays the acquiring object 206 while the acquiring object 206 is being rotated in a direction corresponding to the pressed direction button and moved laterally relatively to the track group 202.

In step S213, the acquiring track deciding means 370 decides a track on which the acquiring object 206 is moving from the coordinates of the acquiring object 206 relative to the track group 202.

If the control input does not come from any one of the direction buttons in step S211, then control goes to step S214 in which the control input processing means 310 performs a processing based on the control input.

After the processing in step S209, the processing in step S210, the processing in step S213, or the processing in step S214, control goes to step S215 (see FIG. 22) in which the end determining means 386 determines there is an end request for the control input processing means 310. If there is no end request, then control returns to step S202 to repeat the processing from step S202.

If there is an end request in step S215, the processing sequence of the control input processing means 310 is finished.

Referring back to the main routine shown in FIG. 17, the gameover determining means 316 determines in step S7 whether a gameover is reached for the present trial or not, based on whether the image sound output processing means 314 has performed various gameover processings in step S115 shown in FIG. 19.

If no gameover is reached for the present trial, then control goes to step S8 in which the sound presentation trial processing means 300 increments the value of the index register j by +1. In step S9, the sound presentation trial processing means 300 determines whether all trials at the terminal are ended or not, based on whether or not the value of the index register j is equal to or greater than the number A of trials.

If not all trials at the terminal are ended, then control returns to step S4 to repeat the processing from step S4. If all trials at the terminal are ended, then control goes to step S10 in which the sound presentation trial processing means 300 increments the value of the index register i by +1.

In step S11, the event image displaying means 302 displays an ith event image, e.g., an image showing guidance to the terminal of an ith country, on the display monitor 18.

In step S12, the sound presentation trial processing means 300 determines whether all trials at all the terminals are ended or not, based on whether or not the value of the index register i is equal to or greater than the number B of terminals.

If not all trials at all the terminals are ended, then control returns to step S3 to repeat the processing from step S3. If all trials at all the terminals are ended, then the processing sequence of the sound presentation trial processing means 300 is ended.

As described above, the entertainment system 10 according to the present invention has the sound presentation trial processing means 300 for displaying an object 200 in relative motion on one of the tracks, e.g., the track T4, of the track group 202 displayed on the display monitor 18, allowing the user to try to acquire the object 200 with a control input, and outputting a sound assigned to the track when the acquisition of the object 200 with the control input is detected.

Therefore, the object 200 relatively moving on one of the tracks, e.g., the track T4, of the six tracks T1–T6 is displayed on the display monitor 18. At this time, the user enters a certain control input trying to acquire the object 200. If the user acquires the object 200, the sound assigned to the track on which the object 200 has been relatively moving is outputted.

Since there are a plurality of tracks T1–T6, when objects 200 are successively acquired on the tracks T1–T6, the sounds assigned to the tracks are successively outputted, and the outputted sounds are combined to complete one piece of music, for example.

As described above, the entertainment system 10 according to the present invention can output a sound in response to a control input entered by the user, adding musical interest to a video game or the like. By producing various sounds in response to control inputs entered by the user, one piece of music can be completed, thereby allowing the user to enjoy the fun of completing a piece of music.

Although a certain preferred embodiment of the present invention has been shown and described in detail, it should be understood that various changes and modifications may be made therein without departing from the scope of the appended claims.

What is claimed is:

1. An entertainment system comprising:
   an entertainment apparatus for executing various programs;
   at least one manual controller for entering control requests from a user into said entertainment apparatus;
   a display unit for displaying images outputted from said entertainment apparatus; and
   sound presentation trial processing means included in said entertainment apparatus for displaying an object relatively moving on at least one track displayed on said display unit, allowing the user to try to acquire the object with a control input entered by the user into one of said at least one manual controller, and outputting a sound assigned to the track on which the object is relatively moving when the acquisition of the object with the control input is detected.

2. An entertainment system according to claim 1, wherein said sound presentation trial processing means comprises:

object displaying means for displaying said object relatively moving on at least one track;

object acquisition determining means for determining whether the object has been acquired with a control input or not; and sound outputting means for outputting a sound assigned to the track on which the object is relatively moving when said object acquisition determining means determines that the object has been acquired.

3. An entertainment system according to claim 2, wherein said sound presentation trial processing means comprises:

acquiring object displaying means for displaying an acquiring object to acquire the relatively moving object; and wherein said object acquisition determining means comprises:

means for determining that said object is acquired if the distance between said acquiring object and the relatively moving object falls in a predetermined range when a predetermined control input is entered from said manual controller.

4. An entertainment system according to claim 3, wherein a plurality of tracks are displayed on said display unit, and said object acquisition determining means comprises:

means for determining that said object is acquired if a track on which said acquiring object and a track on which the relatively moving object are the same as each other when said predetermined control input is entered from said manual controller, and also if the distance between said acquiring object and the relatively moving object falls in said predetermined range.

5. An entertainment system according to claim 4, further comprising:

indicator displaying means for displaying an indicator image indicative of one of said tracks on which said object is coming.

6. An entertainment system according to claim 2, wherein a sound pattern assigned to said track is disposed as a bit string indicative of whether the sound is to be outputted or not outputted, on said track, further comprising:

light spot displaying means for displaying a bit string related to the acquired object and indicative of an output state, of the sound pattern disposed on the track on which the acquired object is positioned, in relative motion as an array of light spots; and wherein said sound outputting means comprises:

means for outputting a sound assigned to a light spot which has reached said acquiring object, of the sound pattern assigned to said track.

7. An entertainment apparatus for connection to a manual controller for outputting a control request from a user and a display unit for displaying images, comprising:

sound presentation trial processing means included in said entertainment apparatus for displaying an object relatively moving on at least one track displayed on said display unit, allowing the user to try to acquire the object with a control input entered by the user into said manual controller, and outputting a sound assigned to the track on which the object is relatively moving when the acquisition of the object with the control input is detected.

8. A recording medium storing a program and data for use in an entertainment system having an entertainment apparatus for executing various programs, at least one manual controller for entering manual control requests from a user into said entertainment apparatus, and a display unit for displaying images outputted from said entertainment apparatus, the program stored in said recording medium comprising the steps of:

displaying an object relatively moving on at least one track displayed on said display unit;

allowing the user to try to acquire the object with a control input; and outputting a sound assigned to the track on which the object is relatively moving when the acquisition of the object with the control input is detected.

9. A recording medium according to claim 8, wherein said steps include the steps of:

displaying said object relatively moving on at least one track;

determining whether the object has been acquired with a control input or not; and outputting a sound assigned to the track on which the object is relatively moving when the object is determined as acquired.

10. A recording medium according to claim 9, wherein said steps include the step of:

displaying an acquiring object to acquire the relatively moving object; and wherein said step of determining whether the object has been acquired with a control input or not comprises the step of:

determining that said object is acquired if the distance between said acquiring object and the relatively moving object falls in a predetermined range when a predetermined control input is entered from said manual controller.

11. A recording medium according to claim 10, wherein a plurality of tracks are displayed on said display unit, and said steps include the step of:

determining that said object is acquired if a track on which said acquiring object and a track on which the relatively moving object are the same as each other when said predetermined control input is entered from said manual controller, and also if the distance between said acquiring object and the relatively moving object falls in said predetermined range.

12. A recording medium according to claim 11, further comprising the step of:

displaying an indicator image indicative of one of said tracks on which said object is coming.

13. A recording medium according to claim 9, wherein a sound pattern assigned to said track is disposed as a bit string indicative of whether the sound is to be outputted or not outputted, on said track, further comprising the step of:

displaying a bit string related to the acquired object and indicative of an output state, of the sound pattern disposed on the track on which the acquired object is positioned, in relative motion as an array of light spots; and wherein said step of outputting a sound comprises the step of:

outputting a sound assigned to a light spot which has reached said acquiring object, of the sound pattern assigned to said track.

14. A program recorded on a storage medium readable and executable by a computer, for use in an entertainment system having an entertainment apparatus for executing various programs, at least one manual controller for entering manual control requests from a user into said entertainment apparatus, and a display unit for displaying images outputted from said entertainment apparatus, said program comprising the steps of:

displaying an object relatively moving on at least one track displayed on said display unit;

allowing the user to try to acquire the object with a control input; and outputting a sound assigned to the track on which the object is relatively moving when the acquisition of the object with the control input is detected.

* * * * *

UNITED STATES PATENT AND TRADEMARK OFFICE
CERTIFICATE OF CORRECTION

| | | |
|---|---|---|
| PATENT NO. | : 6,702,677 B1 | Page 1 of 1 |
| APPLICATION NO. | : 09/687578 | |
| DATED | : March 9, 2004 | |
| INVENTOR(S) | : Takafumi Fujisawa et al. | |

It is certified that error appears in the above-identified patent and that said Letters Patent is hereby corrected as shown below:

Claim 14, which begins in Column 23, Line 4 of the patent, should be corrected as follows:

Claim 14, in the first two lines thereof, please change "A program recorded on a storage medium readable and executable by a computer, for use" to --A sound outputting method--.
Claim 14, in the seventh line thereof, please change "said program comprising" to --said method comprising--.

Signed and Sealed this

Tenth Day of February, 2009

JOHN DOLL
*Acting Director of the United States Patent and Trademark Office*